United States Patent
Tsutsui et al.

(10) Patent No.: US 6,385,181 B1
(45) Date of Patent: May 7, 2002

(54) ARRAY ANTENNA SYSTEM OF WIRELESS BASE STATION

(75) Inventors: Masafumi Tsutsui; Yoshinori Tanaka; Shuji Kobayakawa, all of Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/143,671

(22) Filed: Aug. 31, 1998

(30) Foreign Application Priority Data

Mar. 18, 1998 (JP) .......................................... 10-068526

(51) Int. Cl.[7] ................................................ H04J 13/00
(52) U.S. Cl. ........................................ 370/335; 370/342
(58) Field of Search ................................ 370/335–337, 370/342, 310, 312, 328, 343, 465, 474, 480, 481, 482, 483, 484, 496, 497, 535, 441, 442, 339, 318, 351, 353, 350, 501, 352; 375/130, 140, 256, 347; 455/450, 455, 465, 13.4, 15, 18, 25, 500, 502, 509, 513, 516, 517, 515, 526; 342/382, 383, 367, 373, 378, 380

(56) References Cited

U.S. PATENT DOCUMENTS

| | | | | |
|---|---|---|---|---|
| 5,442,661 A | * | 8/1995 | Falconer ..................... | 375/205 |
| 5,559,806 A | * | 9/1996 | Kurby et al. ................ | 370/325 |
| 5,835,489 A | * | 11/1998 | Moriya et al. .............. | 370/342 |
| 6,005,854 A | * | 12/1999 | Xu et al. ..................... | 370/335 |
| 6,055,230 A | * | 4/2000 | Feuerstein et al. .......... | 370/335 |
| 6,081,566 A | * | 6/2000 | Molnar et al. .............. | 375/347 |
| 6,118,767 A | * | 9/2000 | Shen et al. .................. | 370/252 |
| 6,137,788 A | * | 10/2000 | Sawahashi et al. ......... | 370/342 |
| 6,141,567 A | * | 10/2000 | Youssefmir et al. ........ | 455/562 |
| 6,173,005 B1 | * | 1/2001 | Kotzin et al. ............... | 375/141 |
| 6,177,906 B1 | * | 1/2001 | Petrus ........................ | 342/378 |
| 6,188,679 B1 | * | 2/2001 | Sato ............................ | 370/335 |

* cited by examiner

Primary Examiner—Dang Ton
(74) Attorney, Agent, or Firm—Rosenman & Colin LLP

(57) ABSTRACT

An array antenna system of a wireless base station in CDMA mobile communications has a beam former for forming a plurality of electric beams by applying beam forming to multipath signals received by a plurality of antenna elements of an array antenna and inputting the beams to despreading/delay-adjusting units (fingers) provided for respective path of multipaths. Each finger despreads each of the plurality of beams input thereto. A beam selector selects despread signals for which desired signal components are large from all beams of all paths, a combiner weights and combines the selected despread signals, and an decision unit decides data based upon the combined signal.

9 Claims, 20 Drawing Sheets

$rr^* = I^2 + Q^2$

COMPLEX CONJUGATE OF KNOWN PILOT SIGNAL (SECTOR ANTENNA ACCORDING TO PRIOR ART)

→ DESIRED WAVE
--→ INTERFERENCE WAVE (ARRAY ANTENNA IN SECTOR)

ARRAY ANTENNA SYSTEM OF WIRELESS BASE STATION

BACKGROUND OF THE INVENTION

This invention relates to a wireless base station array antenna system in CDMA wireless communications. More particularly, the invention relates to an array antenna system for generating multiple beam signals split into an angle for each path of multipaths by an array antenna and beam former and combining the beam signals via a finger unit (despreader/delay-time adjustment unit) for each path to thereby demodulate received data.

Digital cellular wireless communication systems using DS-CDMA (Direct Sequence Code Division Multiple Access) technology have been developed as next-generation mobile communications systems for implementing wireless multimedia communication. In such CDMA communications, transmission information from a plurality of channels or users is multiplexed by spreading codes that differ from one another and transmitted via a transmission path such as a wireless link.

In wireless communications, radio waves from a transmitter arrive at a receiver via several paths (multipaths) having different path lengths. The receiver combines the radio waves. However, the combining of the radio waves is not performed by coherent addition, as a result of which fading occurs. Various diversity schemes have been proposed to deal with such fading. One example is a Rake receiving scheme. Rake reception is a technique which involves identifying signals that have passed through multipaths and combining the signals (by maximum-ratio combining) upon weighting them for reliability, thereby improving the characteristic. A receiver employing such Rake reception in CDMA communication has been proposed as a Rake receiver. FIG. 19A is a block diagram showing the construction of the prior-art Rake receiver, and FIG. 19B is a diagram useful in describing the delay profile thereof.

Shown in FIG. 19A are a searcher 1, fingers $2_1$–$2_3$ each of which is provided for a path of multipaths, a Rake receiver antenna 3, a Rake combiner 4 for combining the outputs of the fingers, and a decision unit 5 for deciding the "1"s and "0"s of received data based upon the output of the combiner 4.

As shown in FIG. 19B, the reception level of the signal sent from a transmitter varies in the receiver in dependence upon each path of the multipaths, and the times of arrival at the receiver differ as well. The searcher 1 (1) measures the profile of the antenna reception level (the temporal transition characteristic of the level), (2) detects the multipaths from multipath signals $MP_1$, $MP_2$, $MP_3$, which are higher than a threshold level, by referring to the profile, (3) identifies delay times from signal occurrence times $t_1$, $t_2$, $t_3$ of respective paths of the multipaths or from a reference time, and (4) inputs despreading start timings $s_1$–$S_3$ and delay-time adjustment data $d_1$–$d_3$ to the fingers $2_1$, $2_2$, $2_3$, respectively, that correspond to the respective paths.

The searcher 1 includes a matched filter 1a, which outputs the autocorrelation of a desired signal contained in the received signal. FIG. 19A illustrates the construction of one channel of a base station. That is, the reception output of the antenna 3 contains other channel components as well. The matched filter 1a uses the spreading code of its own channel to extract the signal component of its own channel from the antenna reception signal. The extracted signal component is delivered as the output. More specifically, when a direct sequence signal (DS signal) that has experienced multipath effects enters the matched filter 1a, the latter outputs a pulse train having a plurality of peaks conforming to arrival times and signal strengths and stores the pulse train in a RAM 1c via a low-pass filter 1b. A path detector 1d refers to the profile (FIG. 19B) that has been stored in the RAM 1c to detect each path constituting the multipaths as well as the delay times, and inputs the start signals $s_1$–$s_3$, which indicate the timings (chip synchronization timings) of the start of despreading, as well as the delay time adjustment data $d_1$–$d_3$, to the respective fingers $2_1$, $2_2$, $2_3$ corresponding to the paths.

The fingers $2_1$, $2_2$, $2_3$ corresponding to the respective paths are identically constructed and each includes a spreading code generator 2a for generating the spreading code assigned to its own channel, a multiplier 2b for multiplying the antenna reception signal by the spreading code to thereby despread the signal, a dump integrator 2c for performing dump integration, a delay time adjustment unit 2d for subjecting the despread signal to a time delay adjustment that conforms to the path, an arithmetic unit 2e which performs an operation for channel estimation, and a multiplier 2f for multiplying the input to the arithmetic unit 2e by the complex conjugate of the output thereof to estimate the channel and output a desired signal wave component corresponding to the channel. The complex conjugate is obtained by reversing the sign of the imaginary portion of the complex number. If the complex number is I+jQ, then the complex conjugate thereof is I−jQ.

FIG. 20 is a diagram useful in describing the channel estimation operation. Shown in FIG. 20 is a transmitting antenna 3' of a mobile station, the antenna 3 of the base station, the arithmetic unit 2e that performs the operation for channel estimation of the finger, the multiplier 2f, and a complex conjugate arithmetic unit 2f' for outputting the complex conjugate. Let's represent a signal transmitted from the transmitting antenna 3' to the destination of the base station, ξ the influence of the wireless path and r the reception output of the base station. The arithmetic unit 2e outputs the product rs* of the input signal r and desired signal s. Accordingly, the output of the arithmetic unit 2e is $$rs^* = s\xi s^* = \xi |s|^2 \propto \xi$$

If there is no fluctuation in amplitude, the output of the complex conjugate arithmetic unit 2f becomes ξ*, and the output of the multiplier 2f becomes $$r\xi^* = s\xi\xi^* = s|\xi|^2 \propto s$$

In other words, if the amplitude does not fluctuate, the signal s that was transmitted to itself is obtained from the multiplier 2f. Accordingly, the arithmetic unit 2e and multiplier 2f in FIG. 19A estimate and output the signal component of their own channel.

Thus, the fingers $2_1$–$2_3$ corresponding to the respective multipaths despread the corresponding multipath signals MP1–MP3 by multiplying them by the spreading codes allocated to the channels and adjust the delays of the despread signals by the path delay times to make the timings agree. The Rake combiner 4 performs maximum-ratio combining of the finger outputs, and the decision unit 5 decides the received data based upon the output of the combiner.

Base station antennas of DS-CDMA communications system currently employ sector antennas. As shown in FIG. 21A, the 360° perimeter of a base station is equally divided to split a cell into a plurality of sectors SC. A sector antenna is an antenna is that allocated to each sector SC. Since there is no directionality within a sector, the antenna is susceptible to interference from other users. Such interference from other users is the main cause of a decline in channel capacity and transmission quality. Research and development in regard to multiple-beam antennas and adaptive array antennas is being carried out in an effort to discover techniques for reducing such interference and improving transmission quality. If the multiple-beam approach is adopted, a directivity pattern is produced, as shown in FIG. 21B, to reduce the susceptibility to interference from other users and improve transmission quality.

As shown in FIG. 22, a multiple-beam antenna performs reception using an array antenna AAT consisting of a plurality of element antennas $AT_1$–$AT_N$, and applies beam forming to antenna output signals by means of a beam former BMF to electrically form multiple beams $B_1$–$B_M$ of prescribed directivity. Each beam of the multiple-beam antenna possesses a directivity pattern of the kind shown in FIG. 23. Accordingly, radio waves emitted from an ith user (mobile station) residing in the directivity direction of beam 2, for example, are received by the array antenna AAT and the beam former BMF outputs the beams $B_1$–$B_M$. The power of beam $B_2$, however, is greater than that of the other beams $B_1$, $B_3$–$B_M$. Data is subsequently demodulated by performing despreading using the beam $B_2$. Thus, in accordance with a multiple-beam antenna, reception is performed upon selecting the optimum beam on a per-user (channel) basis, whereby there are obtained such effects as a reduction in interference between channels, an improvement in reception SN ratio owing to a higher antenna gain and a reduction in terminal transmission power.

FIG. 24 is a block diagram showing the receiving section of a wireless base station. This is the circuitry for one channel. The apparatus includes a receiving array antenna AAT, which has a plurality of antenna elements $AT_1$–$AT_N$, receiving circuits $RVC_1$–$RVC_N$ for performing high-frequency amplification, frequency conversion and quadrature detection, etc., of the received signals, and a reception beam former BF for electrically forming M-number of upward reception beams $B_1$–$B_M$ by applying reception beam forming to the signals received by N-number of antenna elements $AT_1$–$AT_N$.

The receiving Section includes despreading circuits $RSS_1$–$RSS_N$ the inputs to which are the N upward reception beams $B_1$–$B_N$, respectively, output by the reception beam former BF. The despreading circuits $RSS_1$–$RSS_N$ apply despreading processing to the beams $B_1$–$B_N$, respectively, using despreading codes of the channel allocated to the user of interest and output despread signals (I, Q signals). A selection controller SCNT calculates the power of each despread signal and decides the beam for which power is maximum. A selector SEL selects the despread signal of maximum power and outputs the selected signal to a receiving unit RV. The receiving unit RV includes a synchronous detector SDM to which despread signals (I, Q signals) are applied for performing synchronous detection, and an error corrector ECC for applying error correction processing to demodulated reception data. The synchronous detector SDM detects a pilot signal, obtains the phase difference between this received pilot signal and an already known pilot signal and restores the phases of the despread I, Q signals by the amount of this phase difference.

As illustrated in FIG. 25, the beam former BF multiplies output signals $x_1$–$x_N$ of the respective antenna elements by weights $W_{k,i}$ to thereby implement phase rotation, and sums the products to electrically form M-number of upward reception beams 1–M each having a prescribed directivity. If $x_1(nT_c)$ represents the reception signals of N-number of antenna elements and $W_{k,i}$ represents the conversion coefficient of the beam former, then a signal $y_i(nT_c)$ of an ith beam (i=1–M) will be expressed by the following:

$$y_i(nT_c) = \Sigma W_{k,i} \cdot x_k(nT_c) \quad (k=1-N) \qquad (1)$$

The directivity direction of each of the M beams can be applied to the array antenna by deciding the conversion coefficient $W_{k,i}$. As a result, a transmission signal from a user (mobile station) in a prescribed ith directivity direction can be obtained from the ith terminal of the beam former BF. FIG. 26 shows an example of a beam former which performs the operation of Equation (1) using an FFT for beam forming.

The N-number of antenna elements $AT_1$–$AT_N$ (FIG. 24) input reception signals $x_i(nT_c)$ (i=1–N) conforming to the received radio waves to the receiving circuits RVC1–RVCN. Each receiving circuit performs high-frequency amplification, frequency conversion, quadrature detection (QPSK detection) and A/D conversion of the input signal and inputs the resulting signal to the reception beam former BF. The reception beam former BF then digitally forms M-number of beams by applying beam forming to the N-number of input signals. That is, the reception beam former BF obtains the signal $y_i(nT_c)$ of each of the beams 1–M through the conversion expressed by Equation (1). Next, the despreading circuits $RSS_1$–$RSS_N$ perform despreading on a per-channel basis in regard to the plurality of beams, the selector SEL selects the despread signal for which signal power after despreading is maximum, and the receiving unit RV identifies the received data using the despread signal of maximum power.

Thus, the Rake receiver gathers together signals that have been scattered in time by multipaths and implements diversity reception to improve characteristics. Further, the multiple-beam antenna technique adopts the multiple-beam approach within a sector to reduce interference between channels, improve transmission quality and increase channel capacity.

In the prior art, however, the Rake receiver and multiple-beam antenna receiver are utilized separately of each other and, hence, there is a limit upon the improvement in transmission quality and reception characteristic.

SUMMARY OF THE INVENTION

Accordingly, an object of the present invention is to provide a wireless base station array antenna system in which Rake reception and a multiple-beam antenna scheme are combined to improve the transmission quality and the reception characteristic.

Another object of the present invention is to provide a wireless base station array antenna system for producing a plurality of beam signals separated into an angle for each path of multipaths, combining despread signals of one or a plurality of beams, the desired signal components of which are large, from all beams of all paths, and deciding the received data, thereby improving the transmission quality and the reception characteristic.

Still another object of the present invention is to provide a wireless base station array antenna system for producing a plurality of beam signals separated into an angle for each path of multipaths, generating despread signals of one or a plurality of beams, the desired signal components of which are large, from all beams of all paths, and combining the despread signals upon weighting each despread signal based upon adaptive control, thereby improving the transmission quality and the reception characteristic.

In accordance with the present invention, the foregoing objects are attained by providing an array antenna system of a wireless base station comprising (1) a beam former for forming a plurality of electric beams by applying beam forming to signals received by a plurality of antenna elements of an array antenna; (2) a despreading/delay-adjusting unit provided for each path of multipaths for despreading each of the plurality of beams conforming to signals which arrive via said path, applying a delay adjustment conforming to the path to despread signals having a desired signal component that is large, and outputting the result; and (3) a combiner for outputs from each of the despreading/delay-adjusting units by maximum-ratio combining. In accordance with this array antenna system, it is possible to construct a Rake receiver comprising a combination of Rake reception and a multiple-beam antenna scheme, as a result of which transmission quality and reception characteristic can be improved.

The array antenna system further includes a searcher for measuring time intervals at which each multipath signal occurs, and inputting despread start timing and a delay time signal to the despreading/delay-adjusting unit provided for each path of the multipaths. Providing the searcher makes it possible to readily control start timing of despread processing and delay time adjustment of each path.

The searcher measures and preserves delay profiles indicating temporal transitions of levels of all beams output by the beam former, and detects, on a per-beam basis, a path for which the beam level is high from the delay profile of each beam. The despreading/delay-adjusting unit (finger) provided for each path outputs a despread signal conforming to the beam of the high level from among the beams of its own path, and the combiner combines the despread signals output by each of the fingers and decides the received data. If this arrangement is adopted, the received data is decided upon combining the despread signals of beams which include more of the desired signal components. This makes it possible to improve transmission quality and the reception characteristic. In this case the searcher measures and preserves the delay profile of each beam by time sharing processing. This makes it possible to simplify the arrangement.

The array antenna system of the present invention further includes means for selecting the despread signals of one or a plurality of beams, for which power, or correlation value or SIR (signal/interference ratio) is large, from among all beams of all paths. The received data is decided upon combining the selected despread signals. If this expedient is adopted, despread signals are not selected and combined for each path. Rather, the received data is decided upon combining the despread signals of beams for which the power, correlation value or SIR is actually large, i.e., the beams which actually include more of the desired signal components, from among all beams of all paths. This makes it possible to improve transmission quality as well as the reception characteristic.

The array antenna system of the present invention further includes means for obtaining, from among all beams of all paths of the multipaths, a beam for which the result of measuring power, correlation value or SIR is largest, and selecting from each path a despread signal that conforms to this beam. The received data is decided upon combining the selected despread signals. This arrangement assures that even if beam measurement accuracy declines owing to noise, Rake combining will not be performed upon selecting a beam erroneously. As a result, transmission quality and reception characteristic can be improved.

Further, the array antenna system of the present invention has a space diversity configuration in which a plurality of branches each having a finger (despreading/delay-adjusting unit) for each path are arranged spatially at different directivities. From among despread signals of all beams that have entered the finger of each branch, those having desired signal components that are large are selected and combined. Since this arrangement provides the additional effect of space diversity, it is possible to achieve a further improvement in transmission quality and reception characteristic.

The array antenna system according to the present invention further includes (1) a received-data decision unit for deciding received data based upon the output of the combiner, (2) a selection unit for selecting, from all beams of all paths, or on a per-path basis, a plurality of despread signals having a desired signal component that is large, (3) an adaptive controller for deciding a weighting coefficient by adaptive control using the selected despread signals and results of deciding the received data, and (4) a weighting unit for multiplying each despread signal by the weighting coefficient and outputting the product. The combiner combines the weighted outputs and the received-data decision unit decides the received data based upon the output of the combiner. Adopting this arrangement makes it possible to construct a Rake receiver comprising a combination of Rake reception, a multiple-beam antenna scheme and an adaptive array antenna scheme. The result is an improvement in transmission quality and reception characteristic.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) First embodiment (a) Overview of array antenna system of first embodiment

As shown in FIG. 1, the system includes a receiving array antenna 11 having N (N=4 in the illustrated embodiment) antenna elements $11_1$–$11_4$, a beam former 12, the construction of which can be that shown in FIGS. 25, 26, for electrically generating M (M=4 in the illustrated embodiment) directional beams $B_1$–$B_4$ using signals input from each of the antenna elements, despreading/delay-adjusting units (fingers) $13_1$–$13_K$ provided for respective paths of multipaths and indicated by despreading circuits $RSS_1$–$RSS_4$ for despreading the respective beams, and measurement units $14_1$–$14_K$ for measuring power or correlation value. More specifically, the measurement units $14_1$–$14_K$ measure the powers or correlation values of the beams that enter the fingers $13_1$–$13_K$ provided for the respective paths, and output the measured power or correlation value.

Figure 1:
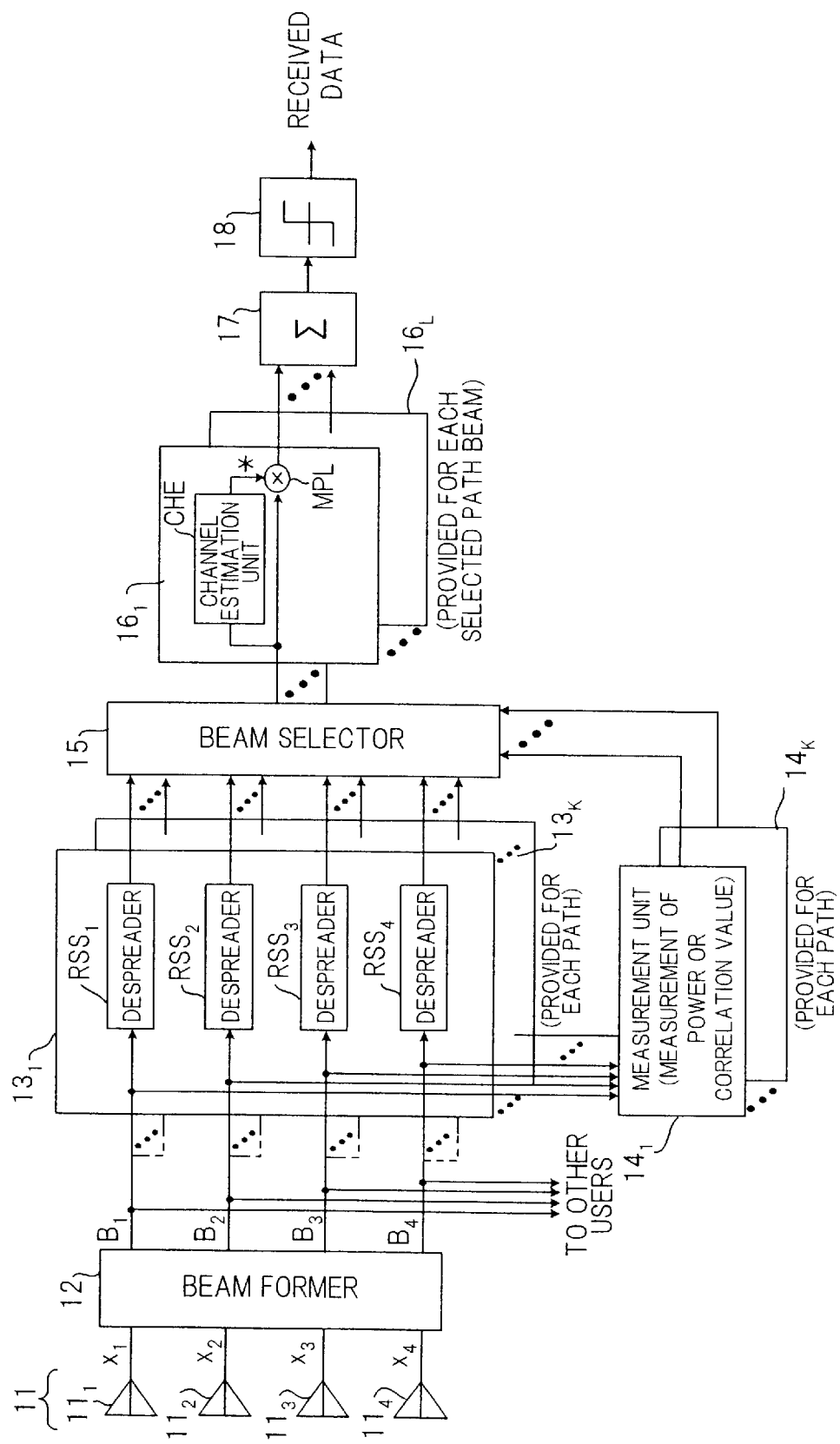
FIG. 1 is a block diagram illustrating the configuration of an array antenna system according to a first embodiment of the present invention.
Figure 2:
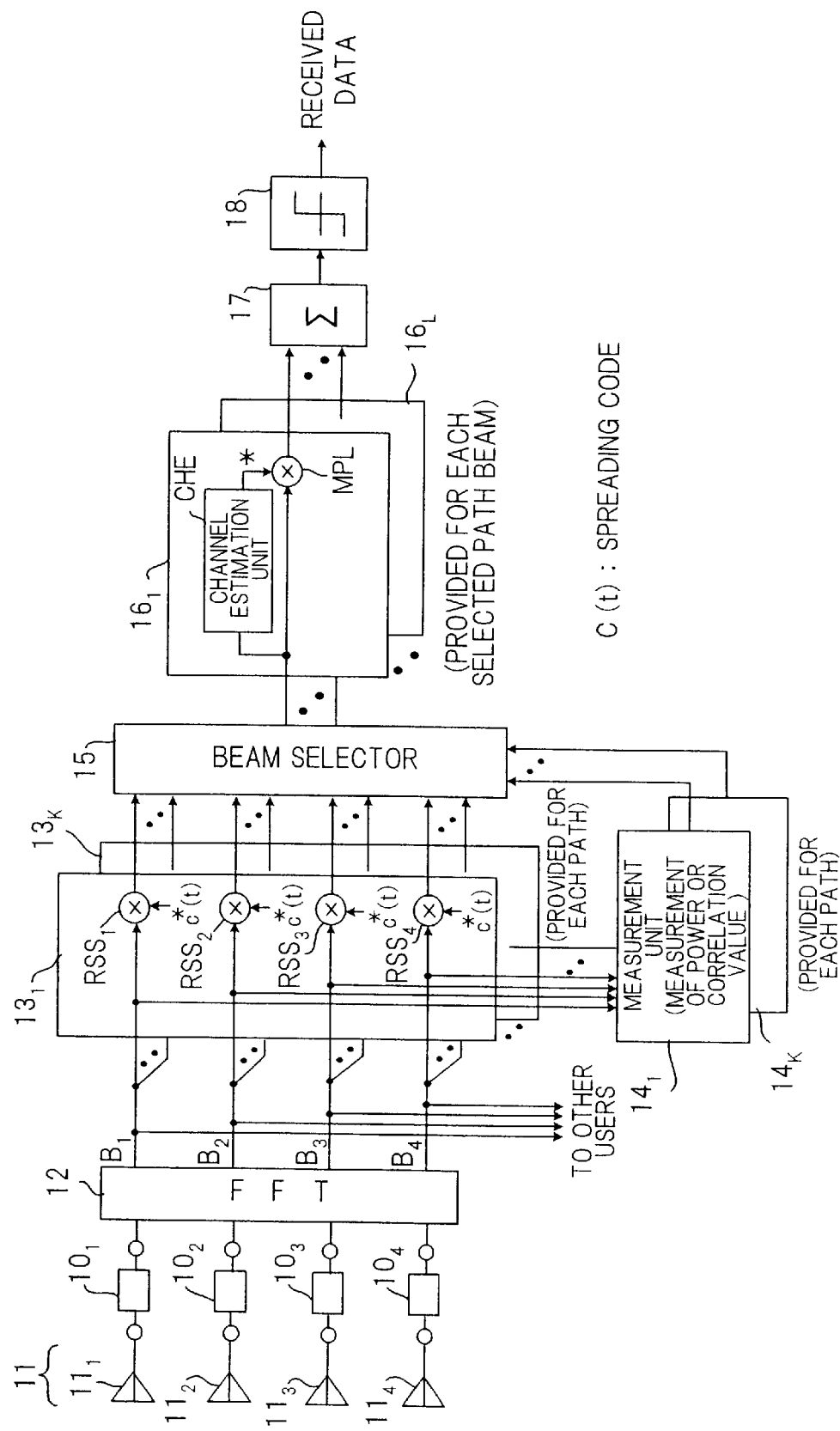
FIG. 2 is a block diagram showing a first modification of the first embodiment.

The system further includes a beam selector 15 for selecting and outputting despread signals corresponding to beams for which the measured values are greater than a set value or to a prescribed number of beams the measured values of which have been arranged in descending order, and channel estimation unit $16_1$–$16_L$ to which the despread signals selected by the beam selector 15 are input. Each channel estimation unit, which has a channel estimating arithmetic unit CHE and a multiplier MPL, estimates and outputs the signal wave component corresponding to its own channel. By performing channel estimation solely in regard to a beam for which the desired wave component selected by the beam selector 15 is large, it is possible to obtain a high channel estimation accuracy and improve the reception characteristic. The system further includes a Rake combiner 17 for combining the signals, which are output by the channel estimation units $16_1$–$16_L$, by maximum-ratio combining, and a data decision unit 18 for deciding the "1"s and "0"s of received data based upon the combined signal from the Rake combiner 17.

The antenna elements $11_1$–$11_4$ input received signals $x_1$–$x_4$ conforming to received radio waves to receiving circuits (not shown). Each receiving circuit performs high-frequency amplification, frequency conversion, quadrature detection (QPSK detection) and A/D conversion of the input signal and outputs the result to the reception beam former 12. The reception beam former 12 digitally forms four beams $B_1$–$B_4$ by applying beam forming to the four input signals and inputs the beams $B_1$–$B_4$ to each of the fingers $13_1$–$13_K$ provided for the respective paths. The fingers $13_1$–$13_K$ each despread the plurality of beams $B_1$–$B_4$, apply a delay time adjustment for each path and output the resulting beams to the beam selector 15 at the same timing. The measurement units $14_1$–$14_K$ concurrently measure the powers of the beams for each path and input the results of measurement to the beam selector 15. The latter selects despread signals corresponding to, e.g., beams for which the measured values are greater than a set value and inputs the despread signals to the channel estimation units $16_1$–$16_L$. The channel estimation units $16_1$–$16_L$ estimate and output the signal wave components corresponding to their own channel. The Rake combiner 17 combines the outputs of the channel estimation units, and the data decision unit 18 decides the "1"s, "0"s of the received data based upon the combined signal.

In accordance with this array antenna system, it is possible to construct a Rake receiver comprising a combination of a Rake reception scheme and a multiple-beam antenna scheme, as a result of which transmission quality and reception characteristic can be improved. Further, despread signals are not selected and combined for each path. Rather, the received data is decided upon combining the despread signals of beams for which the power or correlation value is actually large, i.e., the beams which actually include more of the desired signal wave components, from among all beams of all paths. This makes it possible to improve transmission quality as well as the reception characteristic.

Figure 3:
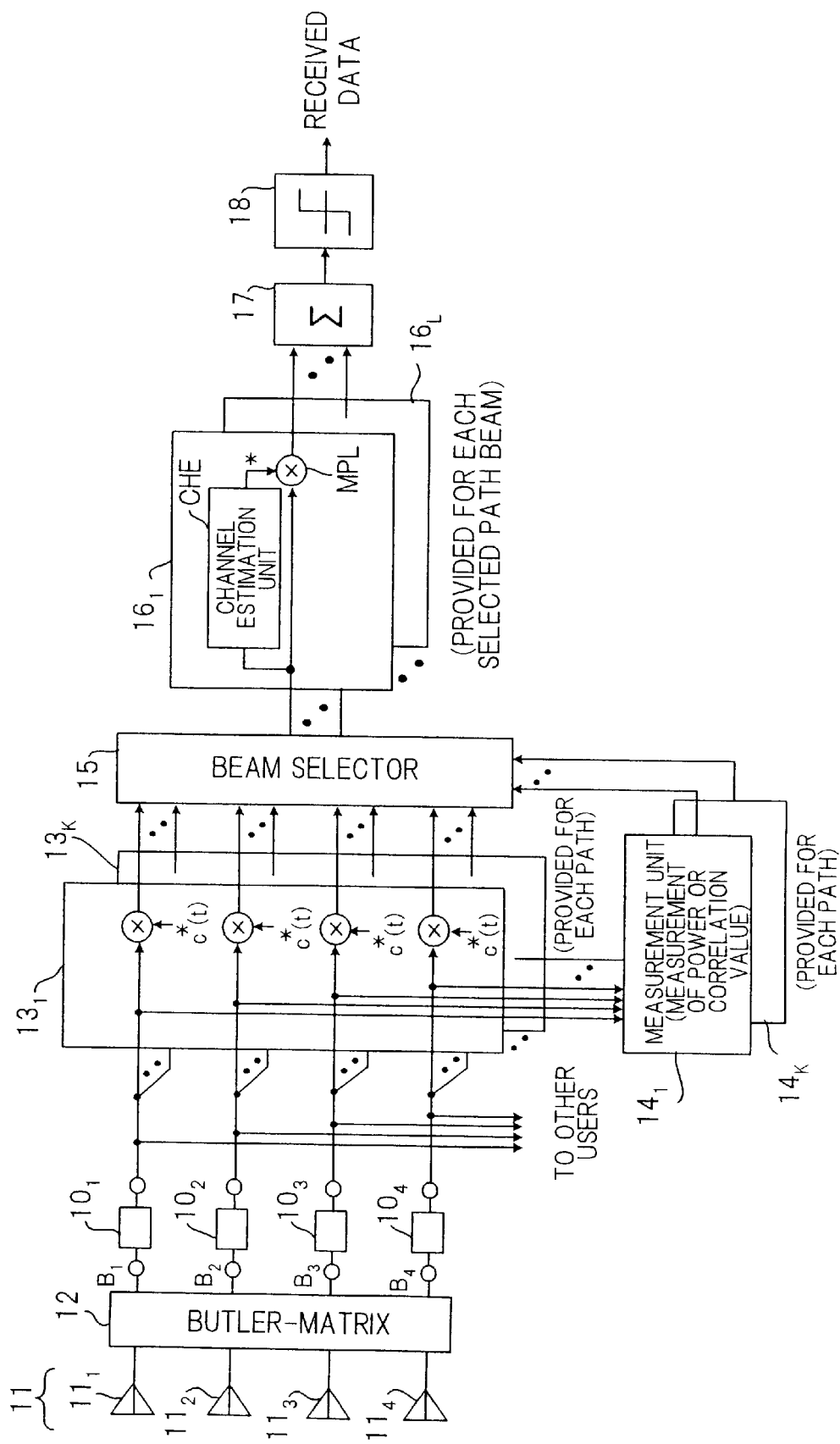
FIG. 3 is a block diagram showing a second modification of the first embodiment.
Figure 25:
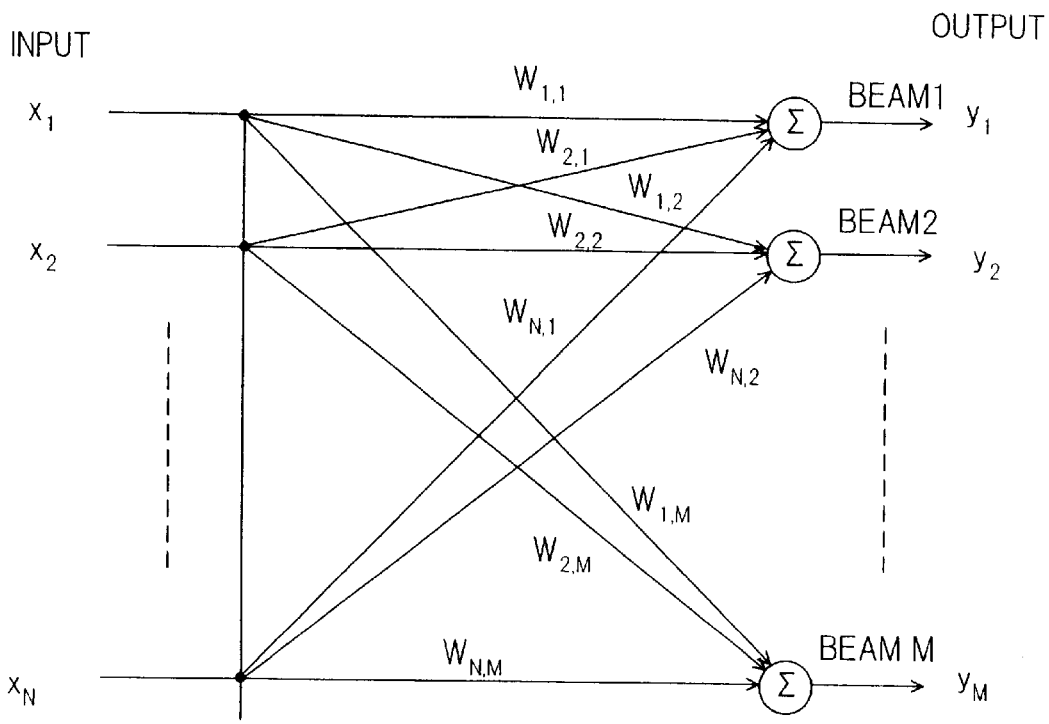
FIG. 25 is a diagram showing the configuration of a reception beam former according to the prior art.
Figure 26:
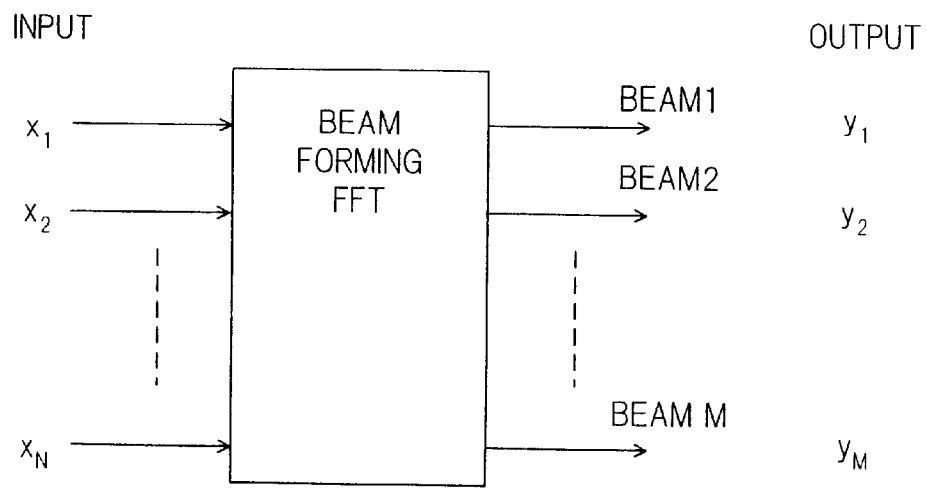
FIG. 26 is a diagram showing the configuration of a beam former using an FFT according to the prior art.

In a case where a beam former comprising an FFT is used as the beam former 12, receiving circuits $10_1$–$10_4$ are provided in front of the beam former 12. The receiving circuits $10_1$–$10_4$ perform high-frequency amplification, frequency conversion, quadrature detection (QPSK detection) and A/D conversion of the antenna output signals and output the resulting signals to the reception beam former 12. Further, in a case (FIG. 3) where a beam former having a Butler-matrix construction beam former of the kind shown in FIG. 25 is used as the beam former 12, the receiving circuits $10_1$–$10_4$ are provided in back of the beam former 12.

(b) Details of array antenna system of first embodiment

Figure 4:
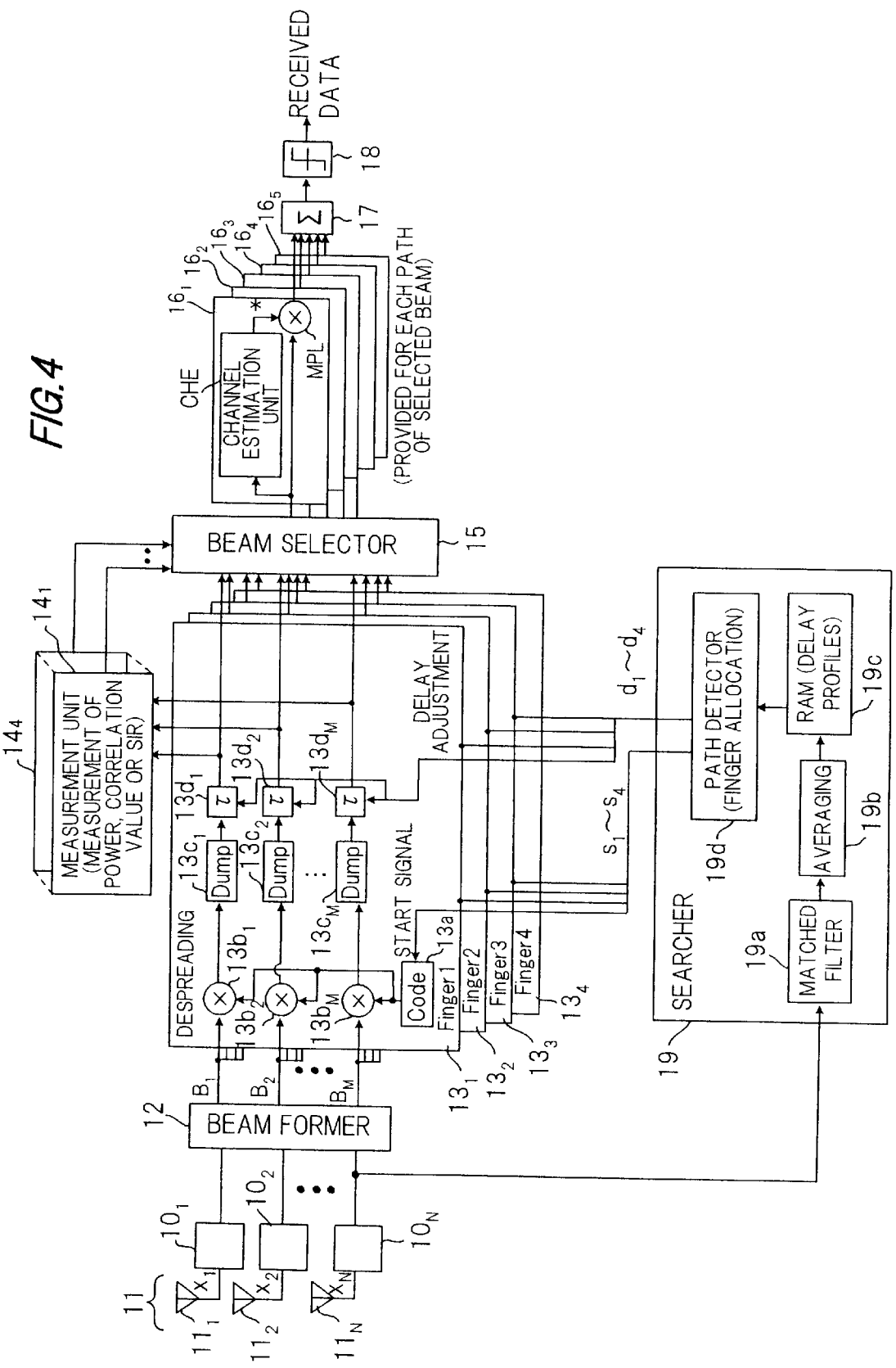
FIG. 4 is a block diagram showing the details of the array antenna system according to the first embodiment.

FIG. 4 is a block diagram showing the details of the array antenna system according to the first embodiment. Components identical with those shown in FIG. 1 are designated by like reference characters. The system of FIG. 4 includes the receiving circuits $10_1$–$10_4$ for performing high-frequency amplification, frequency conversion, quadrature detection (QPSK detection) and A/D conversion of the input signals and outputting the resulting signals to the reception beam former 12, the measurement units $14_1$–$14_4$ for measuring the powers, correlation values or SIRs (signal/interference ratios) on a per-path basis using the signals obtained by despreading, a searcher 19 for measuring the time intervals at which multipath signals are generated and inputting despread processing start timings and delay time signals to the fingers (despreading/delay-adjusting units) $13_1$–$13_4$ provided for respective paths of the multipaths.

Figure 19A:
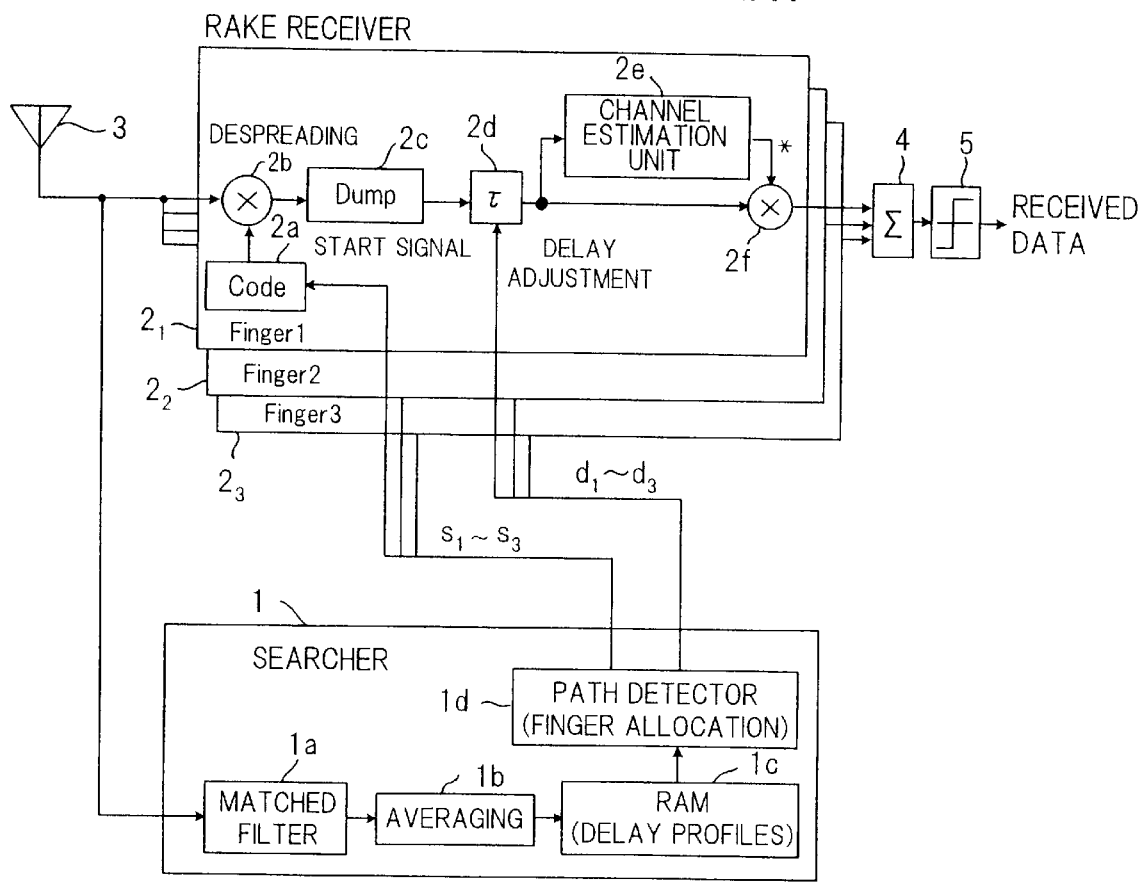
FIG. 19A is a block diagram showing the construction of the prior-art Rake receiver.
Figure 19B:
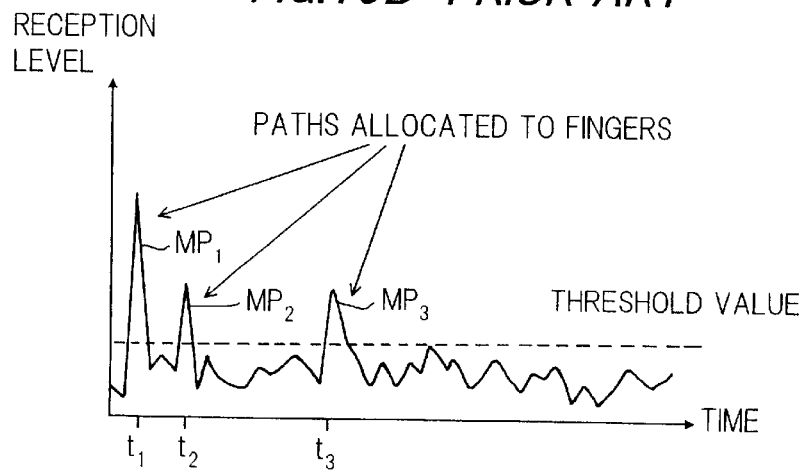
FIG. 19B is a diagram useful in describing the principles thereof.
Figure 20:
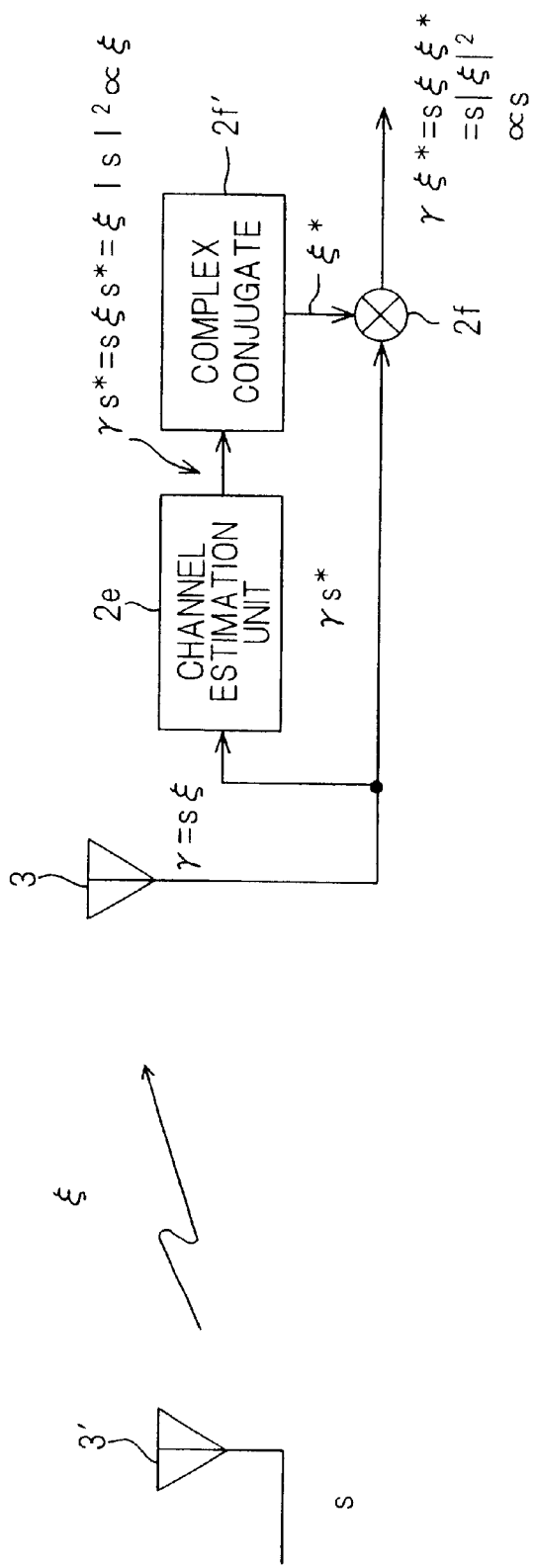
FIG. 20 is a diagram useful in describing a channel estimation operation according to the prior art.
Figure 21A:
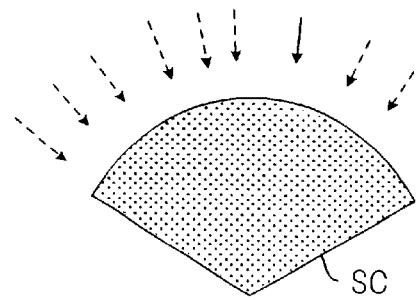
FIGS. 21A, 21B are diagrams useful in describing sector antennas according to the prior art.
Figure 21B:
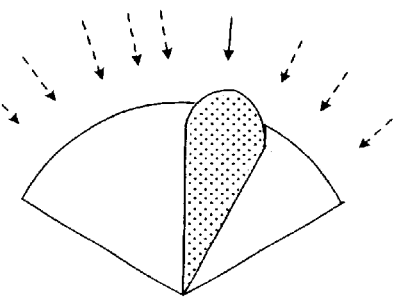
Figure 22:
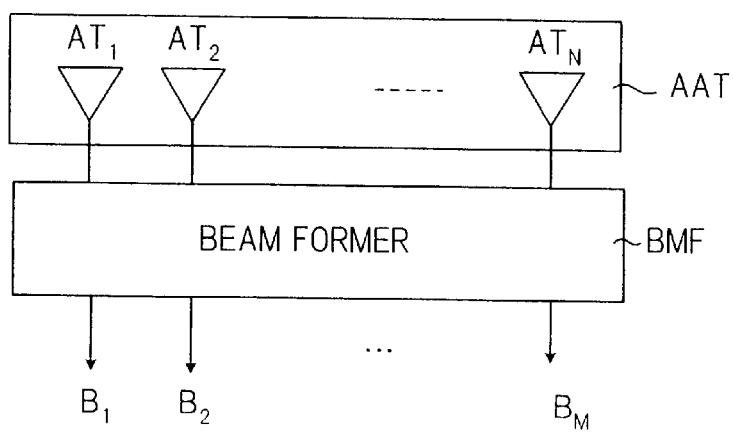
FIG. 22 is a diagram useful in describing a multiple-beam antenna according to the prior art.
Figure 23:
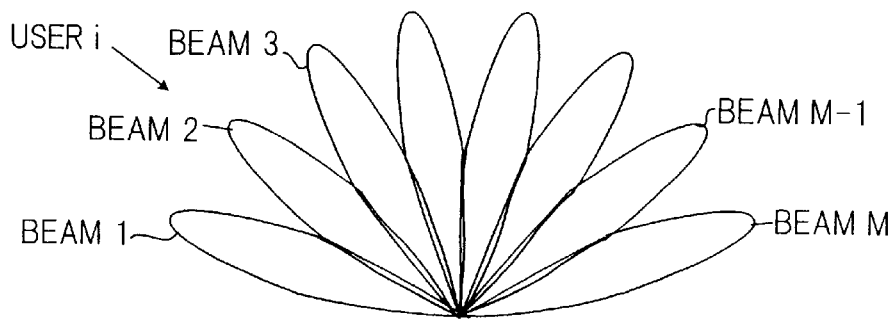
FIG. 23 is a diagram useful in describing the disposition of multiple beams according to the prior art.
Figure 24:
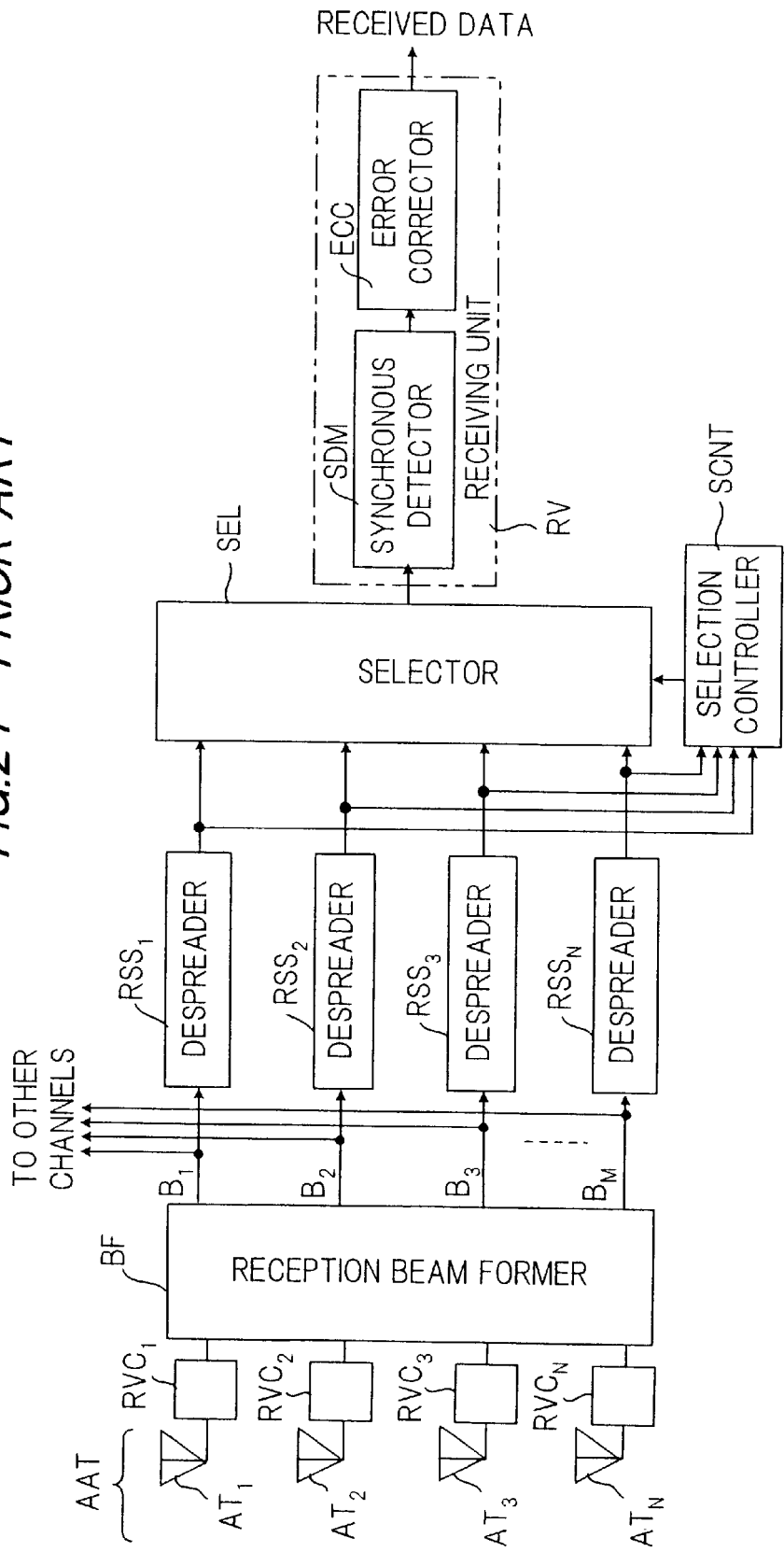
FIG. 24 is a block diagram showing the construction of a multiple-beam antenna system according to the prior art.

The searcher 19 includes a matched filter 19a, which outputs the autocorrelation of a desired channel signal contained in the received signal. The reception output of the antenna element $11_N$ contains other channel components as well. The matched filter 19a uses the spreading code of its own channel to extract the signal component of its own channel from the antenna reception signal. More specifically, when a direct sequence signal (DS signal) that has experienced multipath effects enters the matched filter 19a, the latter outputs a pulse train having a plurality of peaks conforming to arrival times signal strengths and stores the pulse train in a RAM 19c upon averaging the signal via a low-pass filter 19b. A path detector 19d refers to the delay profile (FIG. 19B) that has been stored in the RAM to detect the multipaths as well as the delay times, and inputs the start signals $s_1$–$s_4$, which indicate the timings of the start of despreading, as well as the delay time adjustment data $d_1$–$d_4$, to the fingers $13_1$–$13_4$, respectively, that correspond to the paths.

The fingers $13_1$–$13_4$ corresponding to the respective paths are identically constructed and each includes a spreading code generator 13a for generating the spreading code assigned to its own channel, multipliers $13b_1$–$13b_M$ for multiplying the beams $B_1$–$B_M$ input from the beam former 12 by the spreading code to thereby despread the beams, dump integrators $13c_1$–$13c_M$ for applying dump integration to the outputs of the respective multipliers, and delay time adjustment units $13d_1$–$13d_M$ for subjecting the despread signals to a time delay adjustment that conforms to the path.

The antenna elements $11_1$–$11_N$ input the received signals $x_1$–$x_N$ conforming to the received radio waves to the receiving circuits $10_1$–$10_N$. Each receiving circuit performs high-frequency amplification, frequency conversion, quadrature detection (QPSK detection) and A/D conversion of the input signal and outputs the result to the reception beam former 12. The reception beam former 12 digitally forms the M-number of beams $B_1$–$B_M$ by applying beam forming to the N-number of input signals and inputs the beams to each of the fingers $13_1$–$b_K$ provided for the respective paths. The fingers $13_1$–$13_K$ each despread the plurality of beams $B_1$–$B_M$ at the timings indicated by the searcher 19, apply a delay time adjustment for each path to the despread signals of the beams based upon the delay adjustment data that enters from the searcher 19, and output the resulting beams to the beam selector 15 at the same timing.

The measurement units $14_1$–$14_4$ concurrently measure the powers of the beams for each path and input the results of measurement to the beam selector 15. The beam selector 15 obtains beams for which the measured values are greater than a set value, selects the despread signals that conform to these beams and inputs the despread signals to the channel estimation units $16_1$–$16_L$. The channel estimation units $16_1$–$16_L$ estimate and output the signal wave components corresponding to their own channel. The Rake combiner 17 combines the outputs of the channel estimation units, and the data decision unit 18 decides the "1"s, "0"s of the received data based upon the combined signal.

(c) Measurement units

The measurement units $14_1$–$14_4$ provided to correspond to the fingers $13_1$–$13_4$, respectively, are identically constructed and capable of measuring the powers, correlation values or SIRs (signal/interference ratios) of all beams of each path.

(c-1) Power

Figure 5:
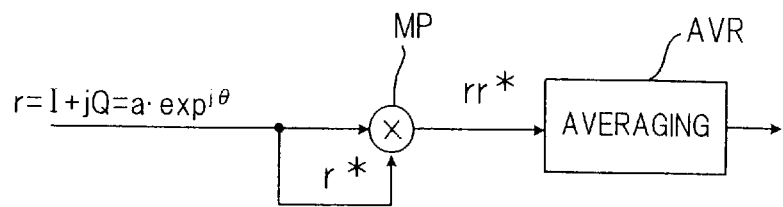
FIG. 5 is a diagram showing the construction of a power calculation unit.

FIG. 5 is a diagram showing the construction of a device for measuring power. The device includes a multiplier MP and an average-value circuit AVR. If the I signal (in-phase signal) and Q signal (quadrature signal) obtained by despreading are expressed in the I-Q complex plane, then we have $I+jQ=(I^2+Q^2)^{1/2}\exp(j\theta)$. Accordingly, the multiplier MP multiplies r (=I+jQ) by its complex conjugate r* (=I−jQ), after which the average-value circuit AVR calculates the average value and outputs the power ($I^2+Q^2$).

(c-2) Correlation value

Figure 6:
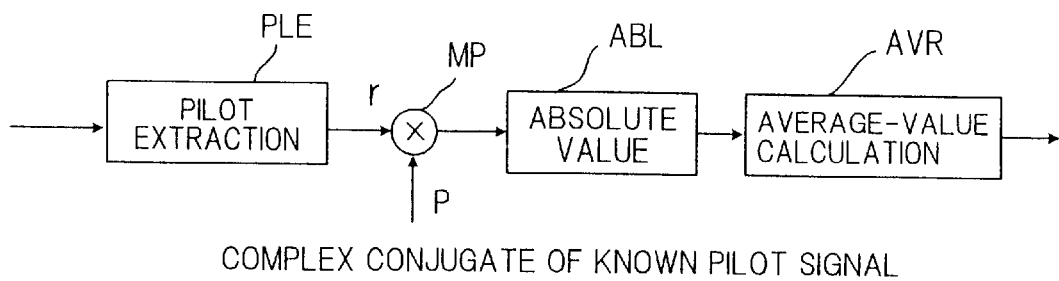
FIG. 6 is a diagram showing the construction of a correlation-value calculation unit.

FIG. 6 is a diagram showing the construction of a device for measuring correlation value. The device includes a pilot extraction unit PLE, a multiplier MP, an absolute-value circuit ABL and an average-value circuit. In order to perform highly precise data demodulation in CDMA communication, a pilot signal is inserted every prescribed number of items of data. A correlation value can be calculated using these pilot signals. More specifically, the pilot extraction unit PLE extracts a pilot symbol r (=I'+jQ') from the signal obtained by despreading and inputs the extracted signal to the multiplier MP. The latter multiplies the received pilot symbol r (=I'+jQ') by the complex conjugate p* (=I−jQ) of the already known pilot symbol p to calculate the correlation, and the average-value circuit AVR averages the absolute-value output and outputs the correlation value. The larger the signal wave component of the desired channel contained in the despread signal, the larger the correlation value.

(c-3) SIR

Figure 7:
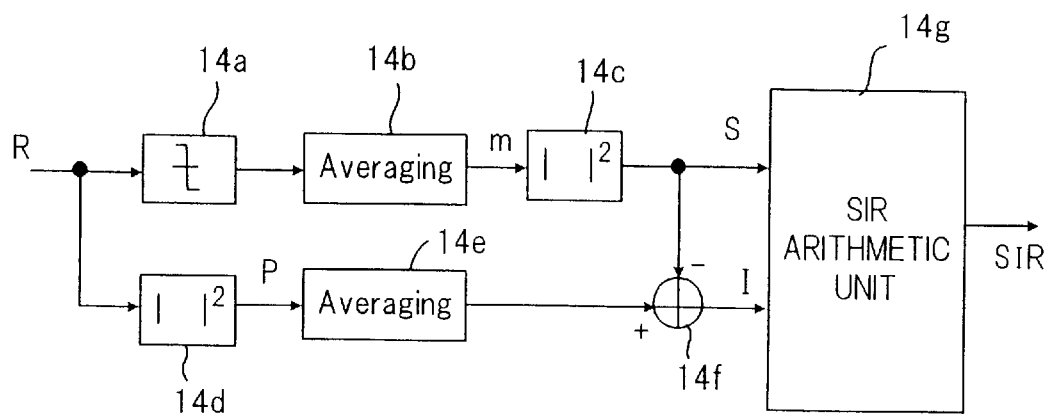
FIG. 7 is a block diagram showing the construction of a SIR measurement unit.
Figure 8:
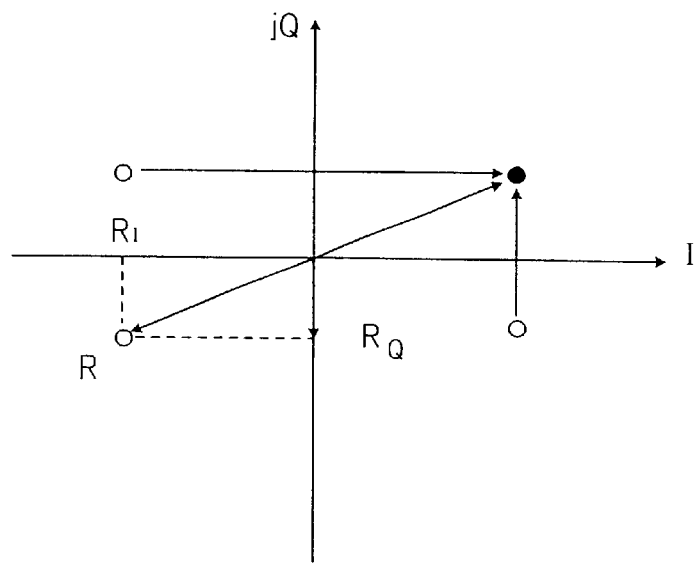
FIG. 8 is a diagram useful in describing a method of changing the quadrant of a position vector.

FIG. 7 is a diagram showing the construction of a device for measuring the SIR (signal/interference ratio). As shown in FIG. 7, the device includes a signal-point position altering unit 14a which, as shown in FIG. 8, converts a position vector R (whose I and Q components are $R_I$ and $R_Q$, respectively) of a received signal point in the I−jQ complex plane to a point in the first quadrant of the plane. More specifically, the signal-point position altering unit 14a takes the absolute values of the I component (in-phase component) $R_I$ and Q component (quadrature component) $R_Q$ of the position vector R of the received signal point to convert this position vector to a signal in the first quadrant of the I−jQ complex plane. The device further includes an averaging arithmetic unit 14b for calculating the average value m of N symbols of the received-signal point position vector, a desired wave power arithmetic unit 14c for calculating $m^2$ (the power S of the desired signal) by squaring the I and Q components of the average value m and summing the squares, and a received-power calculation unit 14d for squaring the I and Q components $R_I$, $R_Q$ of the position vector of the received signal point and summing the squares, i.e., for performing the following calculation:

$$P=R_I^2+R_Q^2$$

to thereby calculate the received power P. The device further includes a subtractor 14f for subtracting $m^2$ (the power S of the desired wave) from the average value of the received power, thereby outputting interference wave power I, and a SIR arithmetic unit 14g for calculating the SIR from the desired wave power S and interference wave power I in accordance with the equation $$SIR=S/I$$

(d) Modifications (d-1) Modification of beam selection

In the first embodiment, despread signals corresponding to those beams among all beams of all paths for which the measured value is greater than the set value are combined upon being adjusted for delay. In noisy environments, there are situations where beam measurement accuracy declines and undesirable beams are selected erroneously, thereby degrading the transmission quality and the reception characteristic. Accordingly, it is necessary to so arrange it that undesirable beams will not be selected erroneously even if beam measurement accuracy declines because of noise.

Figure 9:
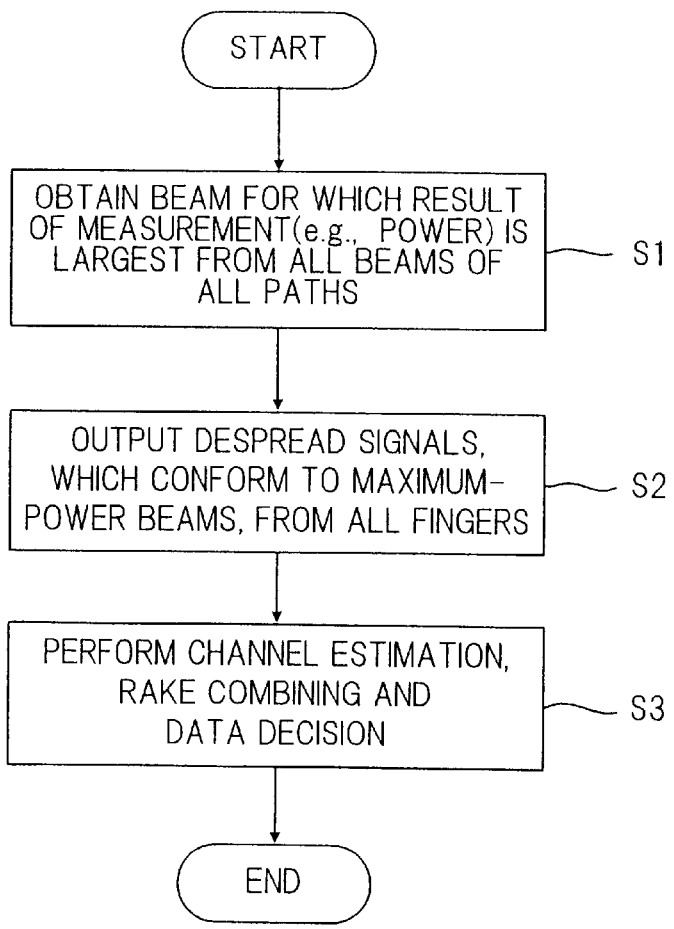
FIG. 9 illustrates a modification of beam selection.

FIG. 9 is a flowchart illustrating a modification of beam selection. The hardware implementation of this modification is the same as that of FIG. 4.

When the results of measuring all beams of all paths enter the selector 15 from the measurement units $14_1$–$14_4$, the selector obtains a beam for which the measured value (e.g., power) is largest (S1). Next, the selector 15 selects despread signals conforming to the beam of maximum power from the fingers $13_1$–$13_4$ of the respective paths and outputs the despread signals (S2). The despread signals selected from the respective paths are then subjected to channel estimation processing, which is followed by Rake combining and decision of the received data (S3). If the power of a first beam of a certain path is largest, for example, then the despread signals corresponding to the first beam are output from all paths (all fingers) and combined, and the received data is then decided.

This arrangement assures that even if beam measurement accuracy declines owing to noise, Rake combining will not be performed upon selecting a beam erroneously. As a result, transmission quality and reception characteristic can be improved.

(d-2) Space diversity

Figure 10:
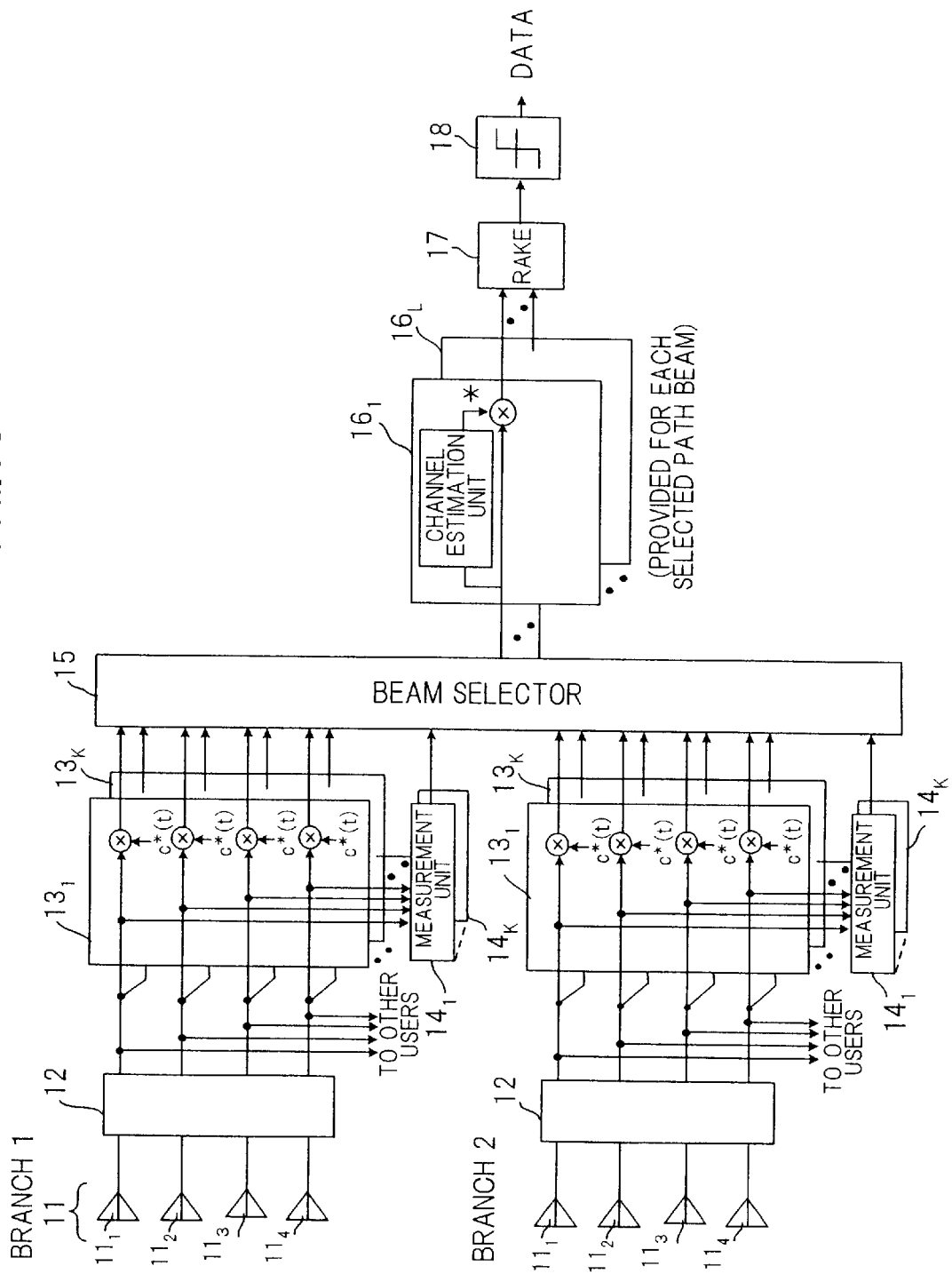
FIG. 10 is a diagram showing a modification of a space diversity arrangement.

In the first embodiment, space diversity is not taken into consideration. However, it is possible to adopt a space diversity arrangement in the manner shown in FIG. 10. Specifically, a plurality of branches (branches 1 and 2) each constituted by the array antenna 11, reception beam former 12, fingers $13_1$–$13_K$ and measurement units $14_1$–$14_K$ are deployed at different directivities. The outputs of all fingers of each branch are input to the beam selector 15. The latter selects and outputs, from among the input despread signals of all beams, those for which the powers (or correlation values or SIRs) are greater than a set value. The signals output by the beam selector 15 are then subjected to channel estimation processing, which is followed by Rake combining and decision of the received data by the data decision unit 18. Since this arrangement provides the additional effect of space diversity, it is possible to achieve a further improvement in transmission quality and reception characteristic.

(B) Second embodiment

In the first embodiment, the measurement units are provided separately of the searcher, one or more beams for which the results of measurement performed by the measurement units are large are selected, and the despread signals corresponding to these selected beams are combined upon being adjusted for delay. However, it is also possible to select beams utilizing delay profiles measured by the searcher without relying upon the measurement units.

Figure 11:
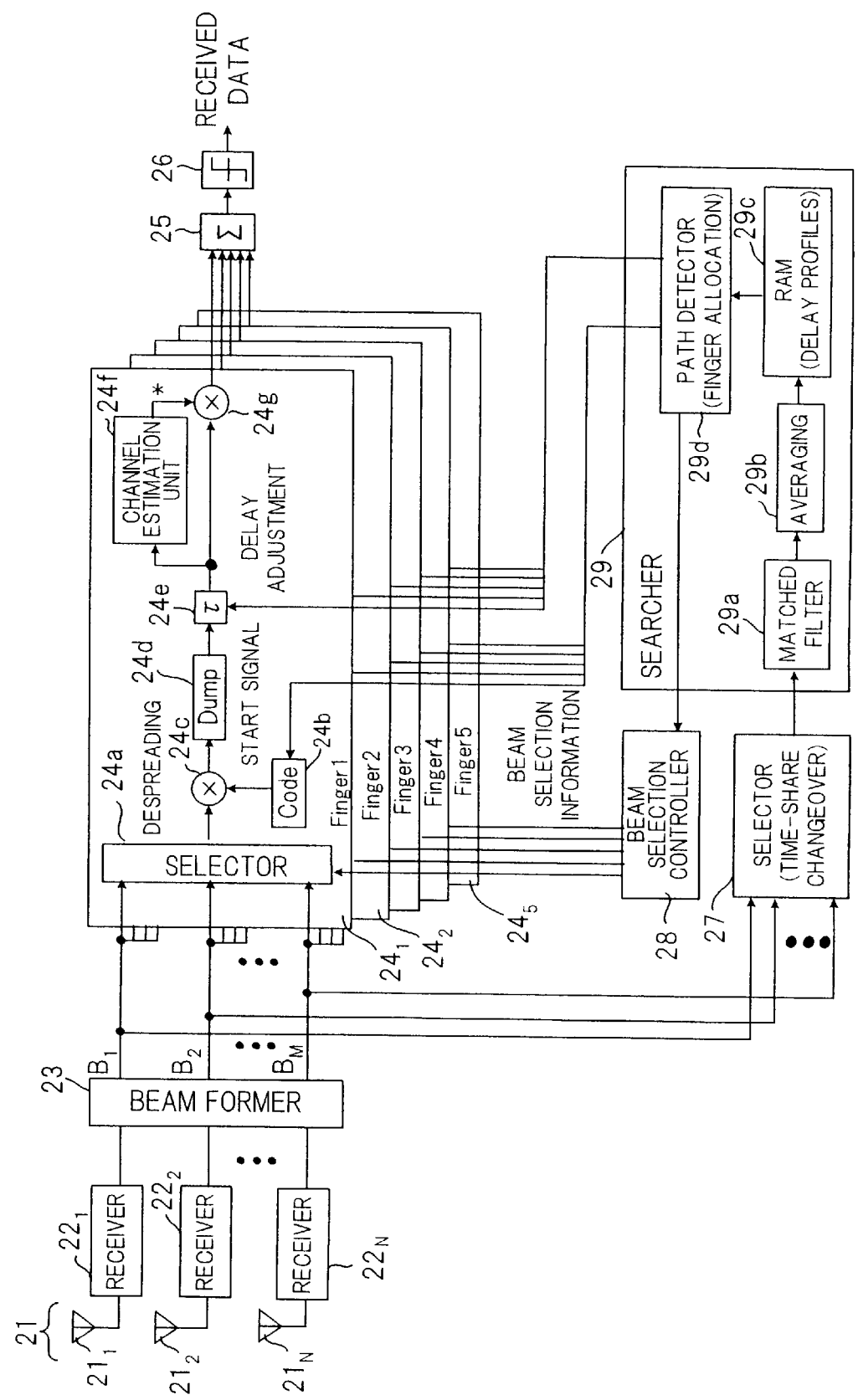
FIG. 11 is a block diagram illustrating the configuration of an array antenna system according to a second embodiment of the present invention.
Figure 12:
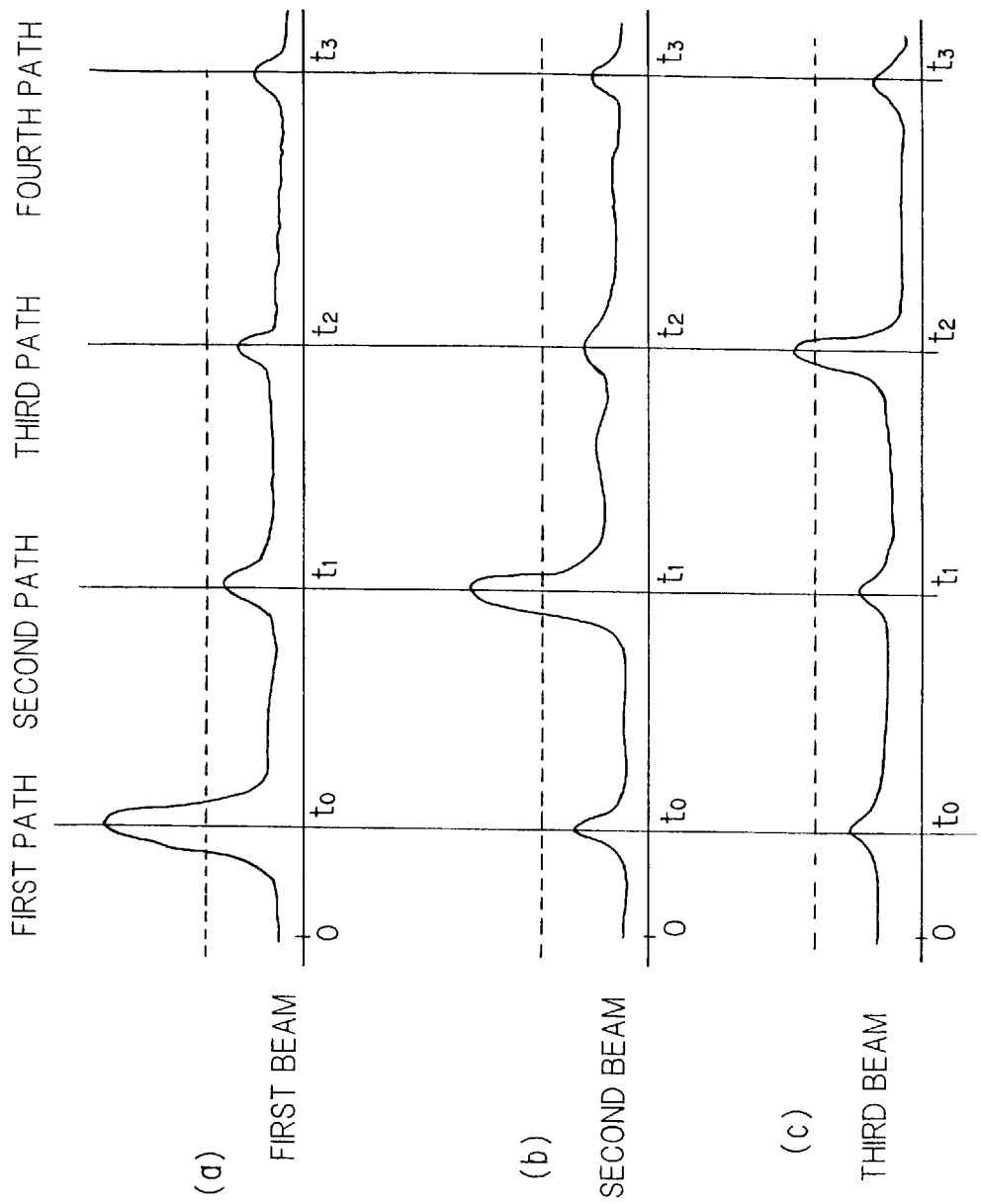
FIG. 12 is a diagram useful in describing the delay profiles of respective beams.

FIG. 11 is a block diagram of such an embodiment, and FIG. 12 shows the delay profile of each beam, in which (a) through (c) are examples of delay profiles of the first through third beams.

As shown in FIG. 11, the system includes a receiving array antenna 21 having N antenna elements $21_1$–$21_N$, and receiving circuits $22_1$–$22_N$ for performing high-frequency amplification, frequency conversion, quadrature detection (QPSK detection) and A/D conversion of the input signals and outputting the resulting signals to a beam former 23. The beam former 23 electrically generates M-number of directive beams $B_1$–$B_M$ using the signals that enter from the antenna elements via the receiving circuits. The system further includes fingers $24_1$–$24_5$ provided for respective paths of the multipaths, a Rake combiner 25 for maximum-ratio combining the signals output from the fingers, a data decision unit 26 for deciding the "1"s and "0"s of received data based upon the combined signal, a selector 27 for selecting and outputting the beams $B_1$–$B_M$ in time-shared fashion, a beam selection controller 28 for indicating the selected beam to the fingers $24_1$–$24_5$ on a per-path basis, and a searcher 29 for (1) retaining the delay profiles (FIG. 12) of the multipath signals on a per-beam basis, (2) referring to the delay profiles and indicating to the beam selection controller 28 whether beam output is allowed or not, and (3) input despread processing start timings as well as delay time signals to the fingers $24_1$–$24_5$ provided for respective paths.

The fingers $24_1$–$24_5$ provided for the respective paths are identically constructed and include a selector 24a for selecting a beam in accordance with the indication from the beam selection controller 28, a spreading code generator 24b for generating the spreading code assigned to its own channel, a multiplier 24c for multiplying the beam selected by the selector by the spreading code, thereby despreading the beam, a dump integrator 24d for performing dump integration, a delay time adjustment unit 24e for subjecting the despread signal to a delay time adjustment that conforms to the path, a channel estimation unit 24f and a multiplier 24g.

The searcher 29 includes a matched filter 29a, a averaging unit 29b, a RAM 29c and a path detector 29d. The matched filter 29a and the averaging unit 29d extract and average signal components of their own channel contained in each of the beams $B_1$–$B_M$ input thereto in time-shared fashion, create delay profiles [(a) through (c) in FIG. 12] on a per-beam basis and store the profiles in the RAM 29c. By referring to the delay profiles of the respective beams, the path detector 29d detects, on a per-beam basis, the path for which the signal level is highest and detects the delay time of each path. More specifically, the path detector 29d retains which beam of which path is output and holds, on a per-path basis, the despread start timings and the delay time data ($t_0$, $t_1$, $t_2$). Further, the path detector 29d instructs the beam selection controller 28 as to whether beam output is allowed or not.

Accordingly, in a case where the signal levels of the first path of the first beam, the second path of the second beam and the third path of the third beam are greater than a set value, as shown in (a) through (c) of FIG. 12, the path detector 29d instructs the beam selection controller 28 that beam output is allowed (1) at the timing of the first beam of the first path, (2) the timing of the second beam of the second path and (3) the timing of the third beam of the third path. As a result, (1) the selector 24a of the finger $24_1$ outputs the first beam of the first path, (2) the selector 24a of the finger $24_2$ outputs the second beam of the second path, and (3) the selector 24a of the finger $24_3$ outputs the third beam of the third path. These beams are thenceforth despread and then subjection to Rake combining.

In accordance with the second embodiment, the measurement units of the first embodiment are dispensed with and the delay profiles of the beams can be measured and retained by time sharing processing.

(C) Third embodiment

In the first embodiment (FIG. 1), one beam selector is provided for all fingers and beams for which the measured value is greater than a set value are selected by the beam selector. According to a third embodiment, however, a beam selector is provided for each finger, several beams are selected per path and the selected beams are combined by maximum-ratio combining.

Figure 13:
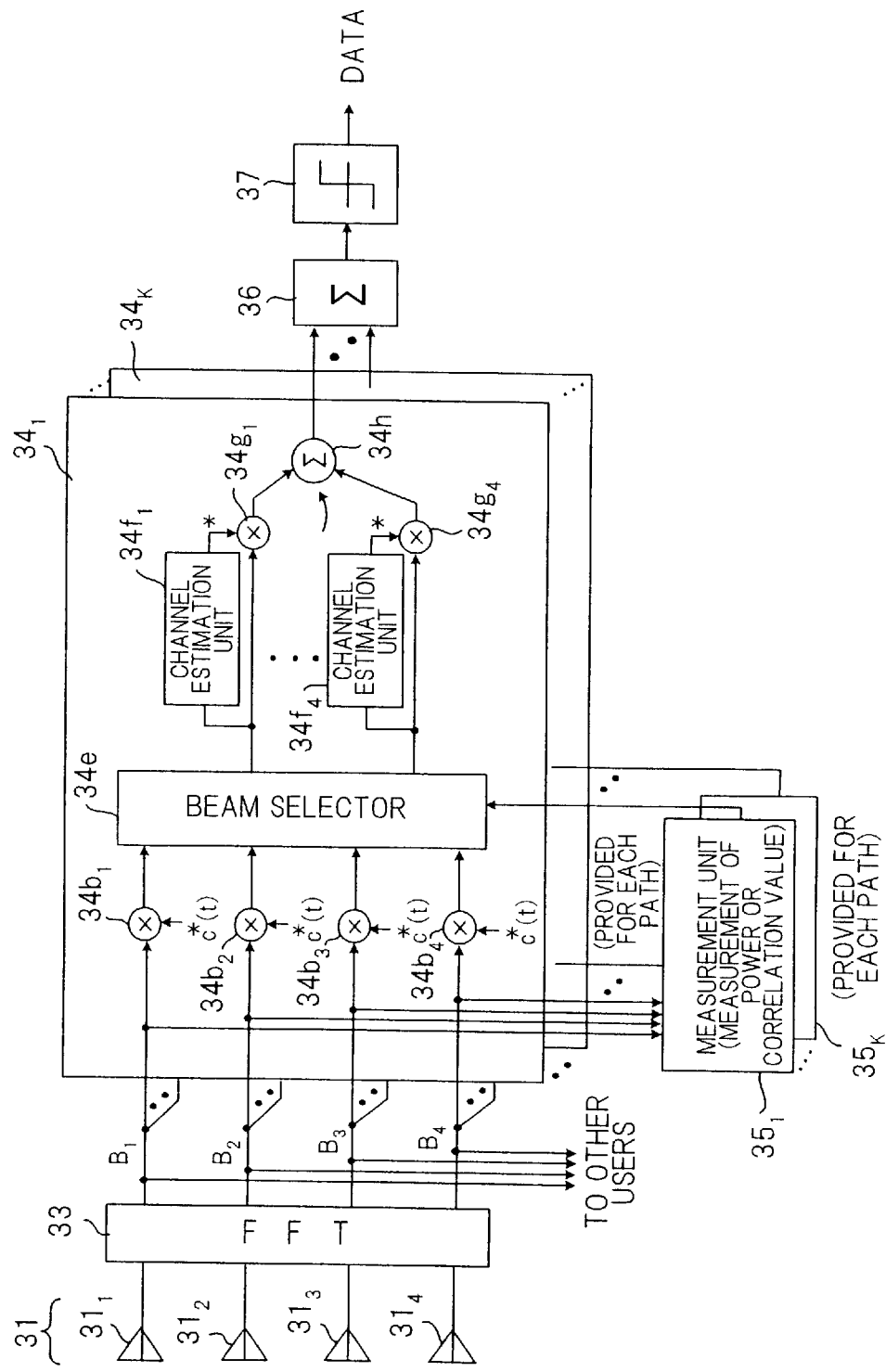
FIG. 13 is a block diagram of an array antenna system according to third embodiment.

FIG. 13 is a block diagram illustrating the configuration of an array antenna system according to the third embodiment.

As shown in FIG. 13, the system includes a receiving array antenna 31 having N (N=4) antenna elements $31_1$–$31_4$, an FFT-implemented beam former 33 for electrically generating M (M=4) directional beams $B_1$–$B_4$ using signals input from each of the antenna elements, and fingers $34_1$–$34_K$, which are provided for respective paths of the multipaths. Each of the fingers $34_1$–$34_K$ includes multipliers $34b_1$–$34b_4$ for multiplying the beams $B_1$–$B_M$ by a spreading code to thereby despread the beams, a beam selector $34e$ for selecting a beam (despread signal) for which the measured value (power, correlation value or SIR) is large, channel estimation units $34f_1$–$34f_4$ for subjecting the selected beams to a channel estimation operation, multipliers $34g_1$–$34g_4$, and an adder $34h$ for adding the outputs of the multipliers. Measurement units $35_1$–$35_K$ measure power (or correlation value or SIR). More specifically, the measurement units $35_1$–$35_K$ measure the power (or correlation value or SIR) of each beam that enters the fingers $34_1$–$34_K$, and output the measured quantity to the beam selector $34e$. A Rake combiner 36 combines, by maximum-ratio combining, the outputs of the adders $34h$ in each of the fingers $34_1$–$34_K$. A data decision unit 37 decides the "1"s and "0"s of received data based upon the combined signal from the Rake combiner 37.

The antenna elements $31_1$–$31_4$ input received signals conforming to received radio waves to receiving circuits (not shown). Each receiving circuit performs high-frequency amplification, frequency conversion, quadrature detection (QPSK detection) and A/D conversion of the input signal and outputs the result to the beam former 33. The reception beam former 33 digitally forms four beams $B_1$–$B_4$ by applying beam forming to the four input signals and inputs the beams $B_1$–$B_4$ to each of the fingers $34_1$–$34_K$ provided for the respective paths. The despreaders $34b_1$–$34b_4$ of each of the fingers $34_1$–$34_K$ despread the plurality of beams $B_1$–$B_4$, apply a delay time adjustment for each path and output the resulting beams to the beam selector $34e$ at the same timing.

The measurement units $35_1$–$35_K$ concurrently measure the powers of the beams input to the corresponding fingers $34_1$–$34_K$ and input the results of measurement to the beam selectors $34e$ of the respective fingers $34_1$–$34_K$. The beam selector $34e$ of each of the fingers $34_1$–$34_K$ selects despread signals conforming to beams for which the set value is greater than a set value and inputs the selected signals to the channel estimation units $34f_1$–$34f_4$ and multipliers $34g_1$–$34g_4$. The channel estimation units $34f_1$–$34f_4$ and multipliers $34g_1$–$34g_4$ estimate the signal wave components conforming to their own channel, and the adder $34h$ adds the channel estimation values and outputs the sum. The Rake combiner 36 combines the outputs of the channel estimation units, and the data decision unit 37 decides the "1"s, "0"s of the received data based upon the combined signal.

In accordance with this array antenna system, a beam selector is provided for each finger, several beams are selected on a per-path basis and the selected beams are combined by maximum-ratio combining. As a result, the channel estimation units can be included in the fingers, thereby making it possible to simplify construction.

Figure 14:
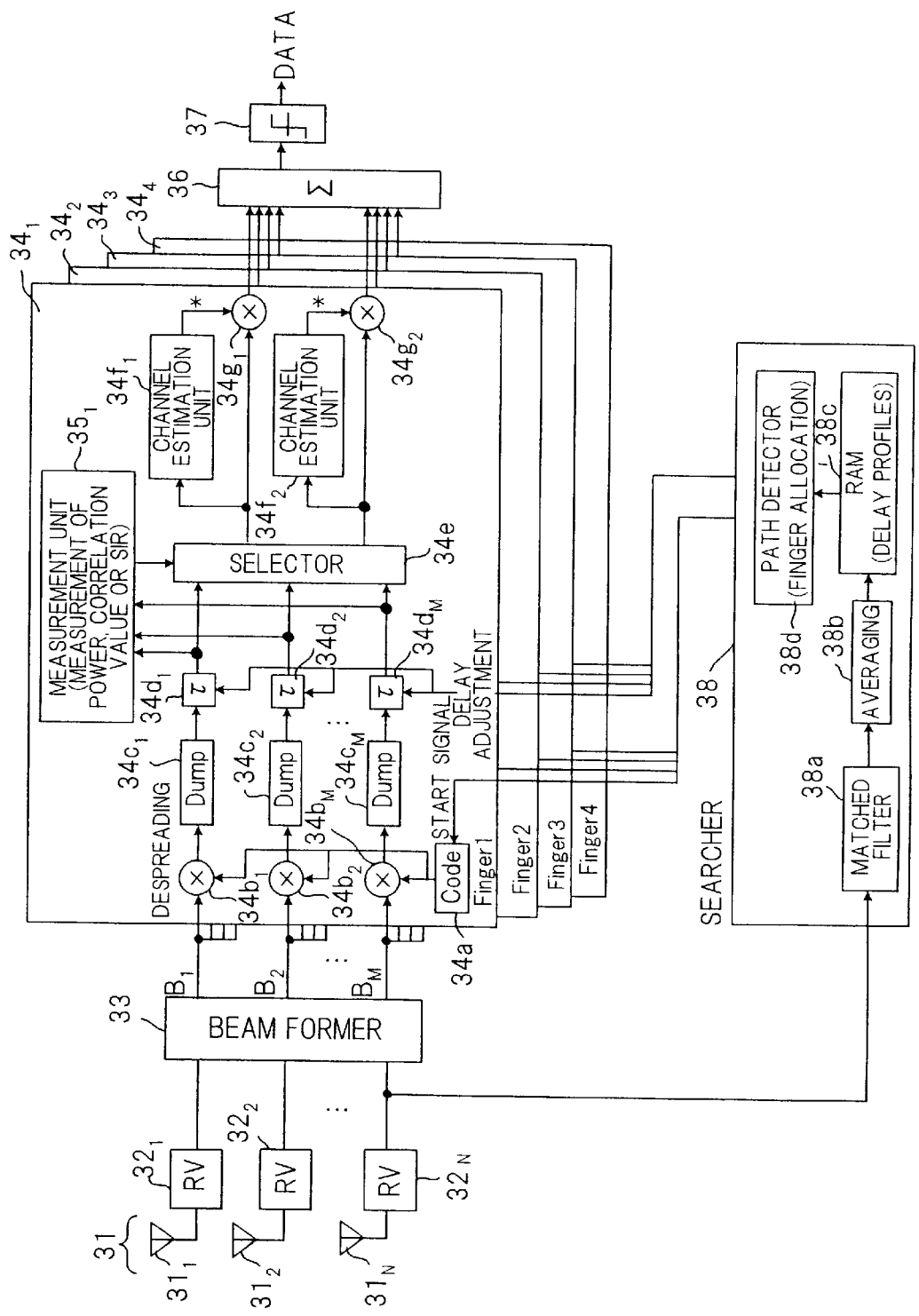
FIG. 14 is a block diagram showing the details of the array antenna system according to the third embodiment.

FIG. 14 is a block diagram showing the details of the third embodiment. Components identical with those shown in FIG. 13 are designated by like reference characters. This diagram differs from that of FIG. 13 in the inclusion of receiving circuits $32_1$–$32_N$ and a searcher 38 and in that the construction of the finger $34_1$ is shown in detail. However, the operation of these receiving circuits $32_1$–$32_N$ and searcher 38 and operation up to the beam selector $34e$ of the fingers $34_1$–$34_4$ is the same as that of the first embodiment shown in FIG. 4.

(D) Fourth embodiment

Figure 15:
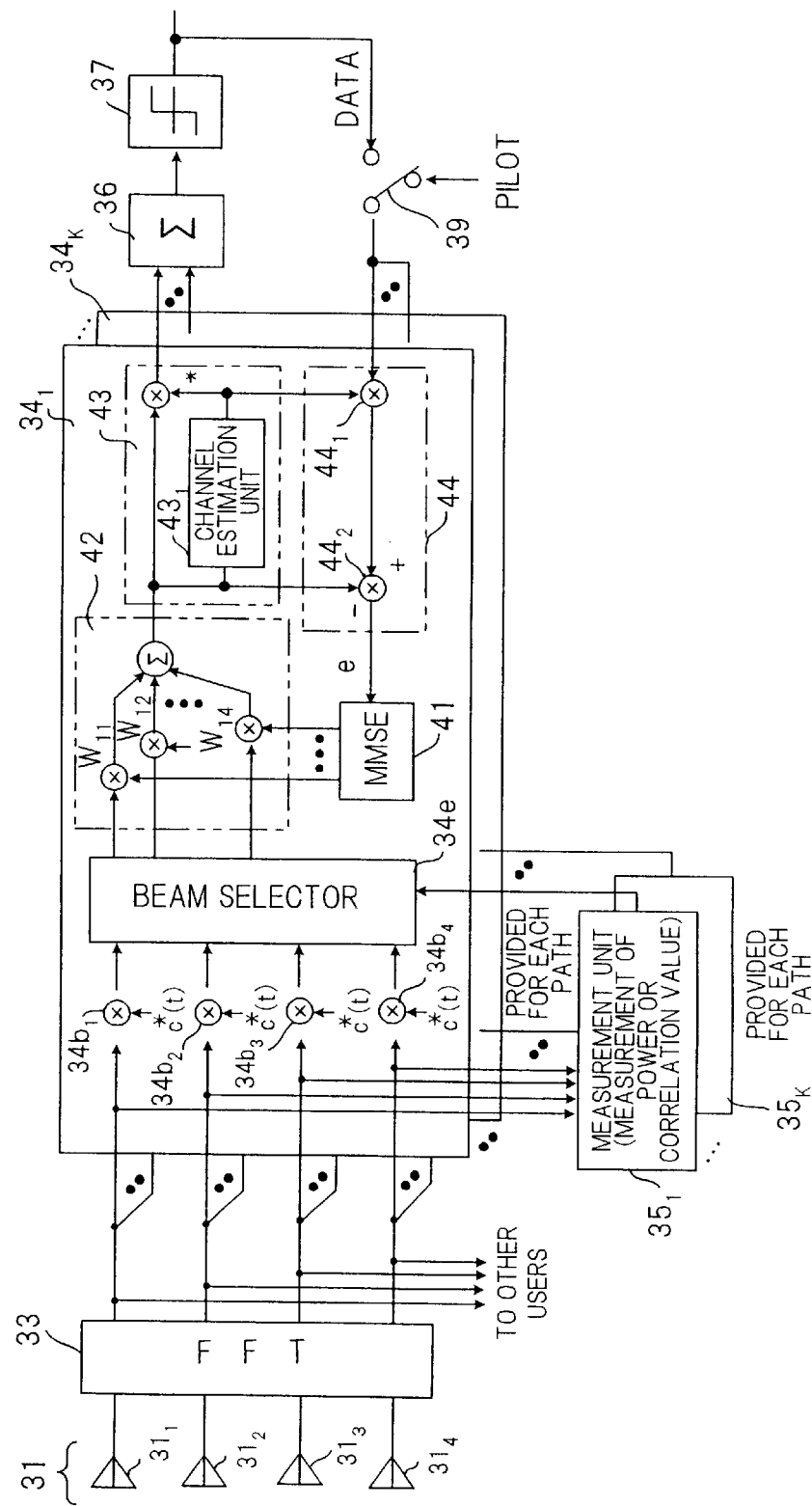
FIG. 15 is a block diagram of an array antenna system according to fourth embodiment.

FIG. 15 is a block diagram showing the configuration of the array antenna system of a fourth embodiment, which includes Rake reception, multiple-beam and adaptive array techniques in combination. Components identical with those of the third embodiment shown in FIG. 13 are designated by like reference characters. This embodiment differs from the third embodiment in that each of the fingers $34_1$–$34_K$ is provided with (1) an MMSE (Minimum-Mean-Squared-Error) adaptive controller 41 for deciding weighting coefficients $w_{i1}$–$w_{i4}$ so as to minimize mean square error, (2) a weighting unit 42 for multiplying the despread signals, which are output by the beam selector $34e$, by the weighting coefficients $w_{i1}$–$w_{i4}$ that have been decided by the adaptive controller 41, and summing the products, (3) a channel estimation unit 43 for applying channel estimation to the signal output by the weighting unit 42, and (4) an error generator 44 for calculating an error that is input to the adaptive controller 41.

The beam selector $34e$ outputs beams (despread signals) for which the measured value (power, correlation value or SIR) is greater than the set value, in a manner similar to that of the third embodiment. The MMSE-type adaptive controller 41 decides the weights (complex weights) $w_{i1}$–$w_{i4}$ so as to minimize the mean square error between a weighted signal and a reference signal, and the weighting unit 42 multiplies the despread signals from the beam selector $34e$ by the weights $w_{i1}$–$w_{i4}$, combines the products and inputs the result to the channel estimation unit 43. The latter subjects the input signal to a channel estimation operation and outputs the result. The Rake combiner 36 combines the output signals from the fingers $34_1$–$34_K$ by maximum-ratio combining, and the data decision unit 37 decides the "1"s and "0"s of the data based upon the combined signal. The output of the data decision unit 37 is fed back to the adaptive controller 41 via the error generator 44.

The data decision unit 37 decides the "1"s and "0"s of the signal obtained by multiplying the weighted combined signal by the complex conjugate of the output from a channel estimating arithmetic unit $43_1$. As a consequence, phase is rotated by an amount obtained by rotation by the complex conjugate. Accordingly, the error generator 44 restores the original phase by multiplying the result of decision from the data decision unit 37 by the output of the channel estimating arithmetic unit $43_1$ using a multiplier $44_1$, calculates the difference between result of decision, the phase of which has been restored, and the weighted combined signal using an error arithmetic unit $44_2$, and inputs the difference to the adaptive controller 41 as an error e. The above-described operation is then repeated so that the weight will converge to a fixed value.

A method of updating weight using a momentary gradient such as an LMS (Least Mean Square) algorithm as the adaptive algorithm results in slow convergence and the initial value of the weight influences the speed of convergence. Convergence can be speeded up by using a method which involves calculating the channel estimation value of each beam selected by the beam selector $34e$ and using the complex conjugates of these channel estimation values as the initial values of the weights $w_{i1}$–$w_{i4}$.

It should be noted that a switch 39 switches between a pilot interval and a data interval, whereby updating of weight is performed based upon the result of decision when the data interval is in effect. Further, in an environment in which there is a great deal of data error, weight updating is performed using only the pilot signals and weight is fixed when the data interval is in effect.

Figure 16:
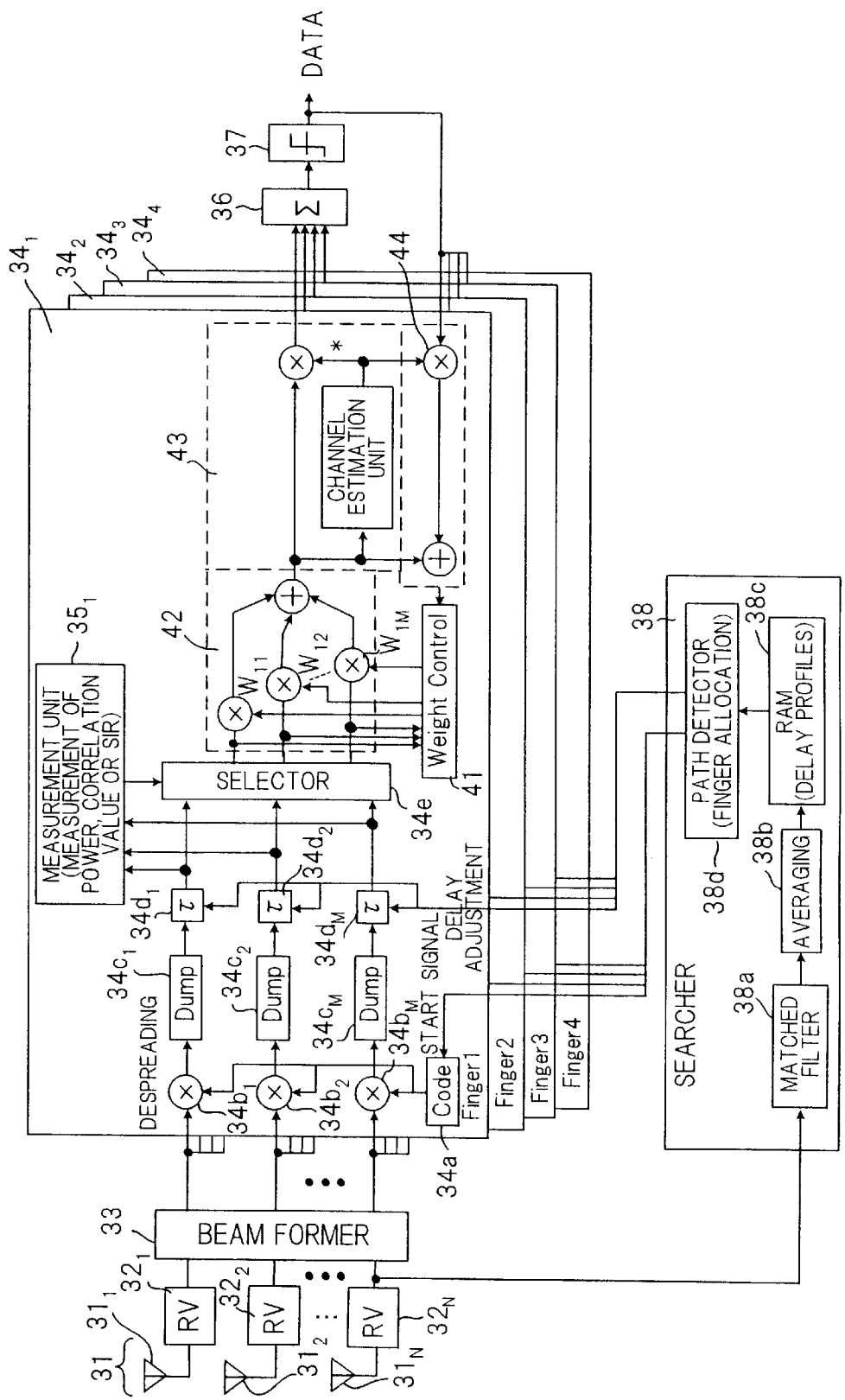
FIG. 16 is a block diagram showing the details of the array antenna system according to the fourth embodiment.

FIG. 16 is a block diagram showing the details of the fourth embodiment. Components identical with those shown in FIG. 15 are designated by like reference characters. This diagram differs from that of FIG. 15 in the inclusion of the receiving circuits $32_1$–$32_N$ and searcher 38 and in that the construction of the finger $34_1$ is shown in detail. However, the operation of these receiving circuits $32_1$–$32_N$ and searcher 38 and operation up to the beam selector 34e of the fingers $34_1$–$34_4$ is the same as that of the first embodiment shown in FIG. 4.

Figure 17:
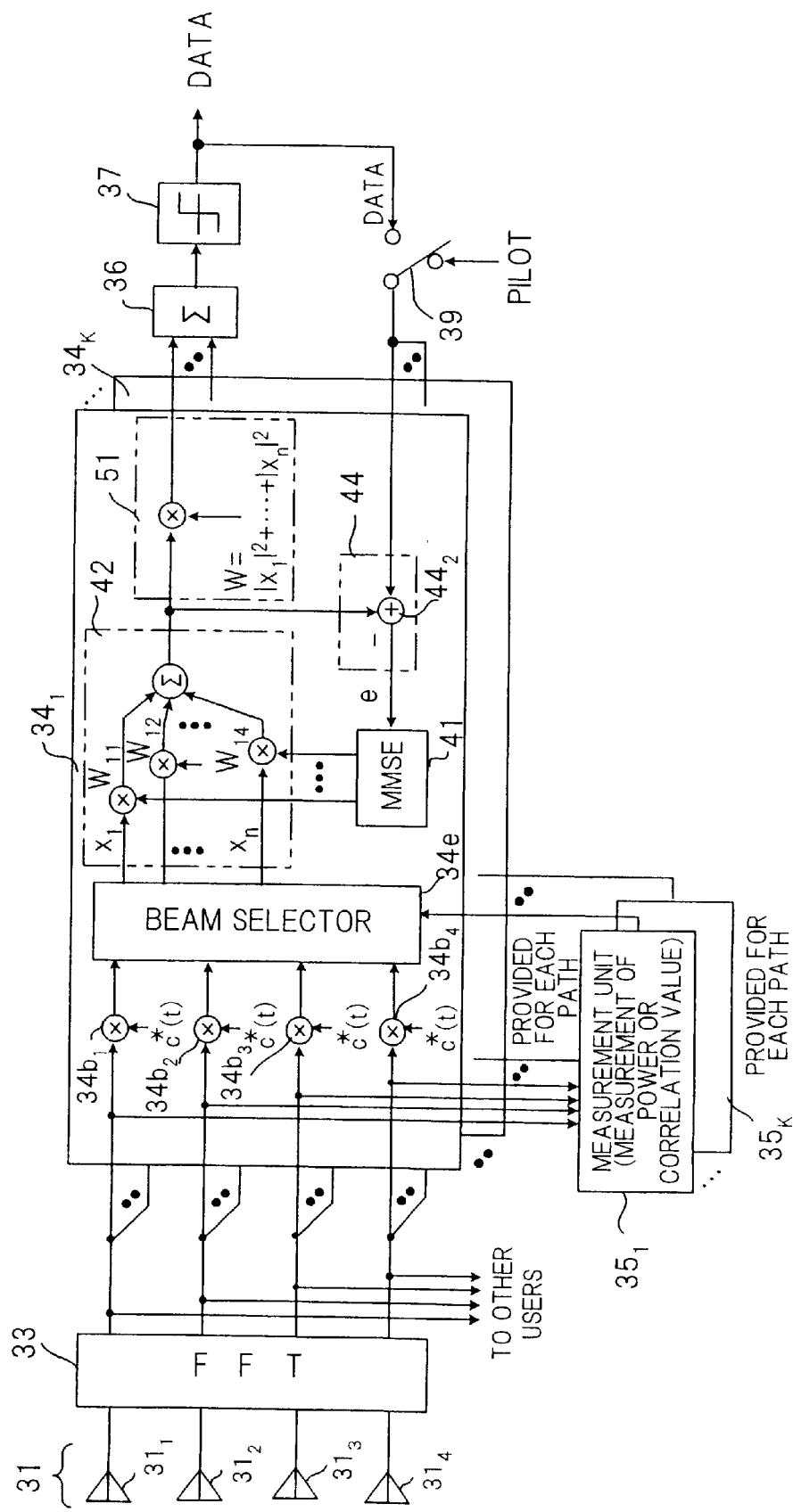
FIG. 17 is a first modification of the fourth embodiment.

FIG. 17 shows a first modification of the fourth embodiment, in which components identical with those shown in FIG. 15 are designated by like reference characters. In the fourth embodiment, channel estimation is carried out by applying a channel estimation operation to the weighted combined signal using the channel estimation unit 43. In this modification, however, not only channel estimation but also weight determination can be performed by the adaptive controller 41.

In this modification, therefore, the channel estimation unit is eliminated, a multiplier 51 is provided instead, and it is so arranged that the output of the weighting unit 42 is multiplied by weight W of the maximum combination weighting unit 42 in such a manner that maximum-ratio combining can be carried out by the Rake combiner 36. The sum of the squares of signals output by the beam selector 34e, namely $$W=|x_1|^2+|x_2|^2+\ldots+|x_n|^2$$

is preferred as the weight W of maximum-ratio combining. It should be noted that equal-ratio combining can also be performed if $$W=(|x_1|^2+|x_2|^2+\ldots+|x_n|^2)^{1/2}$$

is adopted. Further, since there is no phase rotation caused by channel estimation, the error generator 44 does not require a multiplier for restoring the original phase; the error generator 44 is provided only with the error arithmetic unit $44_2$ for calculating error e between the weighted combined signal and the result of decision.

Figure 18:
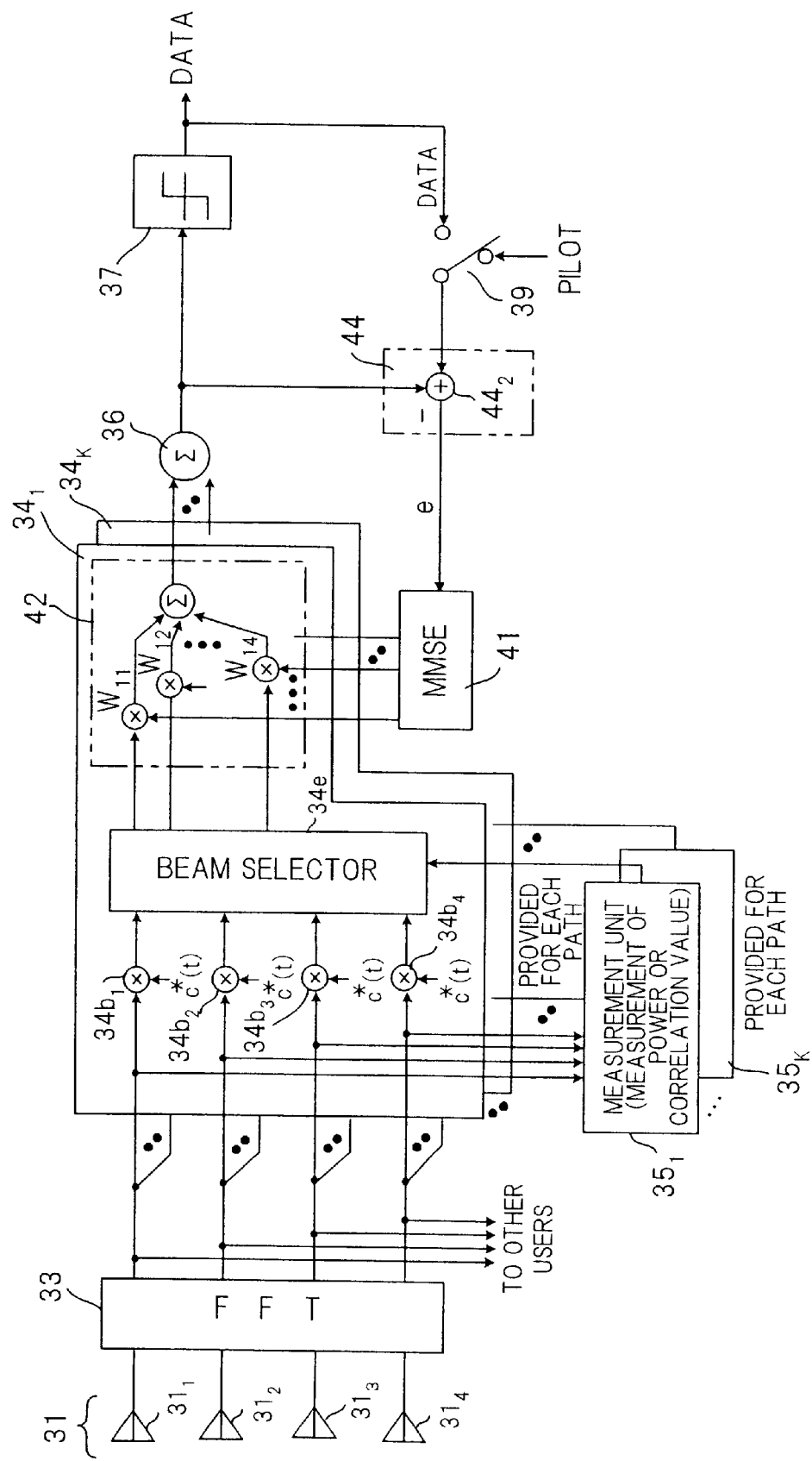
FIG. 18 is a second modification of the fourth embodiment.

FIG. 18 shows a second modification of the fourth embodiment, in which components identical with those shown in FIG. 15 are designated by like reference characters. In the fourth embodiment, beam selection is performed for each path and adaptive control of weighting is carried out on a per-path basis. In this embodiment, however, only one adaptive controller 41 is provided for all paths and decides the weights of all selected beams of all paths. In this case, the difference between the combined signal from the Rake combiner 36 and the result of decision is the error e and the adaptive controller 41 performs control so as to eliminate the error.

Thus, the present invention is such that when an array antenna is used, multiple beams are formed by a beam former, only a beam whose desired wave component (signal power, correlation value or SIR) is high is selected from the beams of each path of multipaths, and the selected beam is subjected to channel estimation and weighting. This contributes greatly to an improvement in the reception characteristic and to a reduction in the scale of the circuitry.

Further, in accordance with the array antenna system of the present invention, it is possible to construct a Rake receiver comprising a combination of Rake reception and a multiple-beam antenna scheme. The result is an improvement in transmission quality and reception characteristic.

Further, in accordance with the present invention, the intervals at which multipath signals occur are measured by a searcher, and despread start timings and delay time signals are input to despreading/delay-adjusting units provided for respective paths of the multipaths. This makes it possible to readily control start timing of despread processing and delay time adjustment of each path.

Further, in accordance with the present invention, the searcher measures and retains delay profiles indicating temporal transitions in regard to the levels of all beams output by the beam former, and detects, on a per-beam basis, a path for which the beam level is high from the delay profile of each beam. The despreading/delay-adjusting unit (finger) provided for each path outputs a despread signal conforming to the beam of the high level from among the beams of its own path, and a combiner combines the despread signals output by each of the fingers and decides the received data. As a result, it is possible to improve transmission quality and the reception characteristic. Further, the searcher is capable of measuring and preserving the delay profile of each beam by time sharing processing. This makes it possible to simplify the arrangement.

Further, in accordance with the present invention, despread signals of one or a plurality of beams, for which the measured value (power, correlation value or SIR) is large, from among all beams of all paths are selected, the selected despread signals are combined and the received data is decided. As a result, the received data is decided upon combining the despread signals of beams for which the desired signal wave component is actually large from among all beams of all paths. This makes it possible to improve transmission quality as well as the reception characteristic.

Further, in accordance with the present invention, the system is so arranged as to obtain, from among all beams of all paths of the multipaths, a beam for which the measured value (power, correlation value or SIR) is largest, select from each path a despread signal that conforms to this beam and combine the selected despread signals to decide the received data. This arrangement assures that even if beam measurement accuracy declines owing to noise, Rake combining will no longer be performed upon selecting a beam erroneously. As a result, transmission quality and reception characteristic can be improved.

In accordance with the present invention, the array antenna system has a space diversity configuration in which a plurality of branches each having a finger (despreading/delay-adjusting unit) for each path are arranged spatially at different directivities. As a result, this arrangement provides the additional effect of space diversity so that it is possible to achieve a further improvement in transmission quality and reception characteristic.

In accordance with the present invention, it is possible to construct a Rake receiver comprising a combination of Rake reception, a multiple-beam antenna scheme and an adaptive array antenna scheme. The result is an improvement in transmission quality and reception characteristic.

As many apparently widely different embodiments of the present invention can be made without departing from the spirit and scope thereof, it is to be understood that the invention is not limited to the specific embodiments thereof except as defined in the appended claims.

What is claimed is:

1. An array antenna system of a wireless base station in CDMA mobile communications, comprising:
   a beam former for forming a plurality of electric beams by applying beam forming to signals received by a plurality of antenna elements of an array antenna;
   a despreading/delay-adjusting unit provided for each path of multipaths for despreading each of the plurality of beams conforming to signals which arrive via said path, applying a delay adjustment conforming to the path to despread signals having a desired signal component that is larger than a set value, and outputting the despread signals having the delay adjustment applied;
   a combiner for outputs from each of said despreading/delay-adjusting units; and
   a searcher which includes a delay profile measuring unit for measuring and retaining delay profiles that indicate temporal transitions of levels of all beams output by said beam former and a path detector for detecting on a per-beam basis, from the delay profile of each beam, a path for which the beam level is high, wherein
   said despreading/delay-adjusting unit provided for each path inputting, to said combiner, a despread signal conforming to the beam of the high level from among the beams of its own path.

2. The system according to claim 1, wherein said searcher measures and retains the delay profile of each beam by time sharing processing.

3. An array antenna system of a wireless base station in CDMA mobile communications, comprising:
   a beam former for forming a plurality of electric beams by applying beam forming to signals received by a plurality of antenna elements of an array antenna;
   a despreading/delay-adjusting unit provided for each path of multipaths for despreading each of the plurality of beams conforming to signals which arrive via said path, applying a delay adjustment conforming to the path to despread signals having a desired signal component that is larger than a set value, and outputting the despread signals having the delay adjustment applied;
   a combiner for outputs from each of said despreading/delay-adjusting units;
   a signal measuring unit for measuring, in regard to all beams of all paths of the multipaths, the size of a desired signal component in terms of power, correlation value or signal/interference ratio; and
   a selecting unit for obtaining, from among all beams of all paths, a beam for which the result of measurement of a desired signal component is largest, selecting from each path a despread signal that conforms to this beam, and inputting each despread signal to said combiner.

4. An array antenna system of a wireless base station in CDMA mobile communications, comprising:
   a beam former for forming a plurality of electric beams by applying beam forming to signals received by a plurality of antenna elements of an array antenna;
   a despreading/delay-adjusting unit provided for each path of multipaths for despreading each of the plurality of beams conforming to signals which arrive via said path, applying a delay adjustment conforming to the path to despread signals having a desired signal component that is larger than a set value, and outputting the despread signals having the delay adjustment applied;
   a combiner for outputs from each of said despreading/delay-adjusting units;
   a signal measuring unit for measuring, in regard to all beams of all paths of the multipaths, the size of a desired signal component in terms of power, correlation value or signal/interference ratio; and
   a selecting unit for selecting the despread signals of one or a plurality of beams, for which result of measurement by said signal measuring unit is large, and inputting the selected despread signals to said combiner, wherein a plurality of said despreading/delay-adjusting unit of respective paths are provided at different directivities, and, from among despread signals of all beams that have entered all of said despreading/delay-adjusting units, those having desired signal components that are large are selected and combined.

5. An array antenna system of a wireless base station in CDMA mobile communications, comprising:
   a beam former for forming a plurality of electric beams by applying beam forming to signals received by a plurality of antenna elements of an array antenna;
   a despreading/delay-adjusting unit provided for each path of multipaths for despreading each of the plurality of beams conforming to signals which arrive via said path, applying a delay adjustment conforming to the path to despread signals having a desired signal component that is larger than a set value, and outputting the despread signals having the delay adjustment applied;
   a combiner for outputs from each of said despreading/delay-adjusting units;
   a received-data decision unit for deciding received data based upon the output of the combiner;
   a selection unit for each path for selecting a plurality of despread signals having a desired signal component that is large;
   an adaptive controller for each path for deciding a weighting coefficient by adaptive control using the selected despread signals and results of deciding the received data; and
   a weighting unit for each path for multiplying each despread signal by said weighting coefficient, combining the products and outputting the result;
   said combiner combining outputs of said weighting unit, and said received-data decision unit deciding received data based upon an output from said combiner.

6. The system according to claim 5, wherein a channel estimation value is obtained for every selected despread signal and a complex conjugate of the channel estimation value is adopted as an initial value of adaptive control.

7. The system according to claim 5, further comprising a channel estimating arithmetic unit for subjecting an output signal of said weighting unit to a channel estimating operation and inputting the result of the channel estimating operation to the combiner.

8. The system according to claim 5, further comprising a weight applying unit for applying a maximum-ratio combining weight conforming to the path to an output signal from said weighting unit and inputting the weight-applied signal to the combiner.

9. An array antenna system of a wireless base station in CDMA mobile communications, comprising:
   a beam former for forming a plurality of electric beams by applying beam forming to signals received by a plurality of antenna elements of an array antenna;
   a despreading/delay-adjusting unit provided for each path of multipaths for despreading each of the plurality of beams conforming to signals which arrive via said path, applying a delay adjustment conforming to the path to despread signals having a desired signal component that is larger than a set value, and outputting the despread signals having the delay adjustment applied;

a combiner for outputs from each of said despreading/delay-adjusting units;

a received-data decision unit for deciding received data based upon the output of said combiner;

a selection unit for selecting, from all beams of all paths, a plurality of despread signals having a desired signal component that is large;

an adaptive controller for deciding a weighting coefficient by adaptive control using the selected despread signals and results of deciding the received data; and a weighting unit for multiplying each despread signal by the weighting coefficient and outputting the product;

said combiner combining the weighted outputs and said received-data decision unit deciding received data based upon an output from said combiner.

* * * * *